(12) United States Patent
Otsubo

(10) Patent No.: US 11,714,296 B2
(45) Date of Patent: Aug. 1, 2023

(54) STEREOSCOPIC IMAGE FORMING DEVICE AND METHOD FOR MANUFACTURING STEREOSCOPIC IMAGE FORMING DEVICE

(71) Applicant: Asukanet Company, Ltd., Hiroshima (JP)

(72) Inventor: Makoto Otsubo, Hiroshima (JP)

(73) Assignee: ASUKANET COMPANY, LTD., Hiroshima (JP)

( * ) Notice: Subject to any disclaimer, the term of this patent is extended or adjusted under 35 U.S.C. 154(b) by 357 days.

(21) Appl. No.: 16/626,036

(22) PCT Filed: May 23, 2018

(86) PCT No.: PCT/JP2018/019859
§ 371 (c)(1),
(2) Date: Dec. 23, 2019

(87) PCT Pub. No.: WO2019/003730
PCT Pub. Date: Jan. 3, 2019

(65) Prior Publication Data
US 2020/0124870 A1    Apr. 23, 2020

(30) Foreign Application Priority Data
Jun. 29, 2017    (JP) .................. 2017-127325

(51) Int. Cl.
*G02B 30/35*    (2020.01)
*G02B 5/08*    (2006.01)
*G02B 5/124*    (2006.01)

(52) U.S. Cl.
CPC ........... *G02B 30/35* (2020.01); *G02B 5/0808* (2013.01); *G02B 5/124* (2013.01)

(58) Field of Classification Search
CPC ........ G02B 30/60; G02B 30/00; G02B 30/35; G02B 30/34; G02B 30/36; G02B 5/0808;
(Continued)

(56) References Cited

U.S. PATENT DOCUMENTS

| 5,035,486 A | 7/1991 | Inokuchi |
| 7,446,733 B1 | 11/2008 | Hirimai |

(Continued)

FOREIGN PATENT DOCUMENTS

| CN | 201021953 Y | 2/2008 |
| CN | 101416094 A | 4/2009 |

(Continued)

OTHER PUBLICATIONS

Extended (Supplementary) European Search Report dated Feb. 8, 2021, issued in counterpart EP application No. 18823284.7. (6 pages).

(Continued)

*Primary Examiner* — Jade R Chwasz
(74) *Attorney, Agent, or Firm* — WHDA, LLP

(57) ABSTRACT

A stereoscopic image forming device in a ring-shape or a shape partly using a ring-shape when viewed from above and a manufacturing method of the same, in which a plurality of first vertical light reflective members 12 are provided in one side of a transparent flat plate material 16 and a plurality of second vertical light reflective members 14 are provided in the other side of the transparent flat plate material 16. The first vertical light reflective members 12 are arranged radially around a reference point X, whereas the second vertical light reflective members 14 are arranged concentrically around a reference point Y overlapping the reference point X when viewed from above. The first vertical light reflective members 12 and the second vertical light reflective members 14 orthogonally intersect each other when viewed from above.

7 Claims, 14 Drawing Sheets

(58) Field of Classification Search
CPC .......... G02B 5/124; G02B 5/122; G02B 5/12; G02B 5/136; G02B 5/085; G02B 5/0858
USPC ........................................................ 359/462
See application file for complete search history.

(56) References Cited

U.S. PATENT DOCUMENTS

| | | |
|---|---|---|
| 2006/0050200 A1 | 3/2006 | Nagao |
| 2006/0055887 A1* | 3/2006 | Hoshino ............... G02B 30/40 348/E13.058 |
| 2009/0059366 A1 | 3/2009 | Imai |
| 2011/0149046 A1 | 6/2011 | Chang |
| 2014/0139777 A1 | 5/2014 | Zhao et al. |
| 2015/0234099 A1 | 8/2015 | Otsubo |
| 2015/0336340 A1 | 11/2015 | Otsubo |
| 2017/0017089 A1 | 1/2017 | Kim et al. |
| 2017/0102552 A1 | 4/2017 | Otsubo |

FOREIGN PATENT DOCUMENTS

| | | | | |
|---|---|---|---|---|
| CN | 102103266 A | | 6/2011 | |
| CN | 102819060 A | | 12/2012 | |
| CN | 104718468 A | | 6/2015 | |
| CN | 104937448 A | | 9/2015 | |
| CN | 106461957 A | | 2/2017 | |
| JP | 50-32813 B1 | | 10/1975 | |
| JP | 2006-91821 A | | 4/2006 | |
| JP | 2011-90117 A | | 5/2011 | |
| JP | 2011090117 A | * | 5/2011 | |
| JP | 2012-155345 A | | 8/2012 | |
| KR | 20140083930 A | * | 7/2014 | ........... G02B 5/3025 |
| KR | 101698779 B1 | | 1/2017 | |
| WO | 2009/131128 A1 | | 10/2009 | |
| WO | 2015/186789 A1 | | 12/2015 | |
| WO | 2016/132984 A1 | | 8/2016 | |

OTHER PUBLICATIONS

Office Action dated Mar. 18, 2021, issued in counterpart CN Application No. 201880028387.8, with English Translation. (22 pages).

Notification of Reason for Refusal dated Mar. 23, 2021, issued in counterpart KR Application No. 10-2020-7001315, with English Translation. (8 pages).

Grant of Patent dated Aug. 24, 2021, issued in counterpart KR Application No. 10-2020-7001315, with machine translation. (7 pages).

Notice of Decision of Granting Patent Right for Invention dated Nov. 16, 2021, issued in counterpart CN Application No. 201880028387.8, with English translation. (2 pages).

Second Search Report issued in counterpart CN Application No. 201880028387.8. (2 pages).

International Search Report dated Aug. 7, 2018, issued in counterpart application No. PCT/JP2018/019859 (1 page).

Notification of Reasons for Refusal dated Jul. 23, 2019, issued in counterpart Japanese Patent Application No. 2019-526694, w/English translation (4 pages).

Decision to Grant a Patent dated Aug. 20, 2019, issued in counterpart Japanese Patent Application No. 2019-526694, w/English translation (5 pages).

Office Action dated Feb. 10, 2022, issued in counterpart KR application No. 10-2021-7037404, with English translation. (18 pages).

* cited by examiner

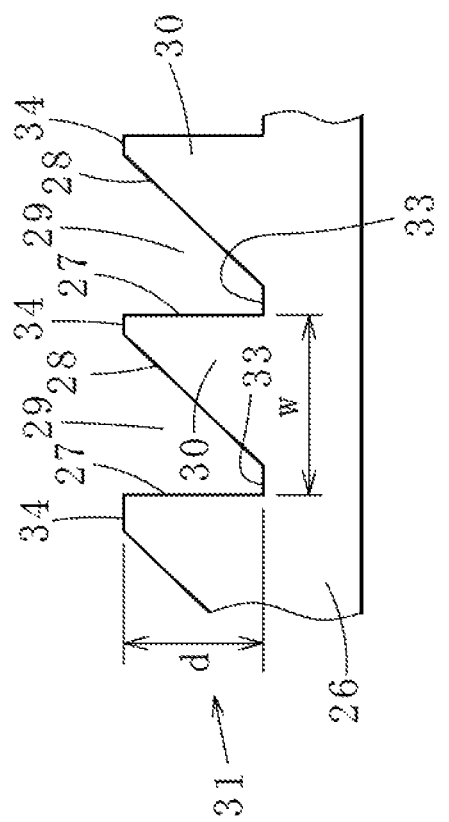
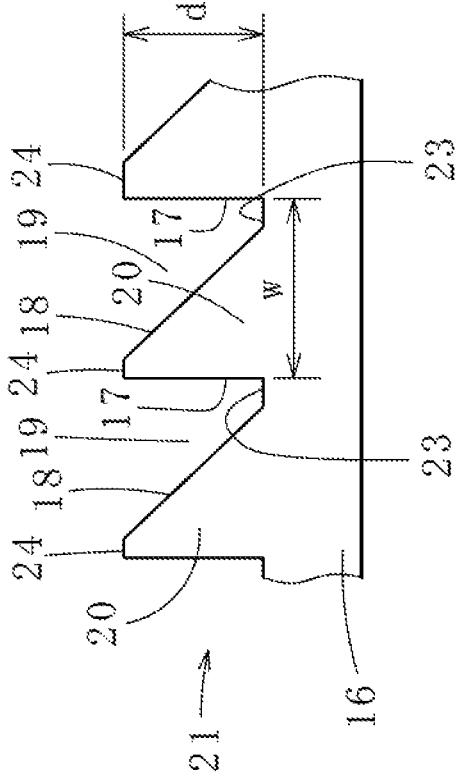
FIG. 3 (A)
FIG. 3 (B)

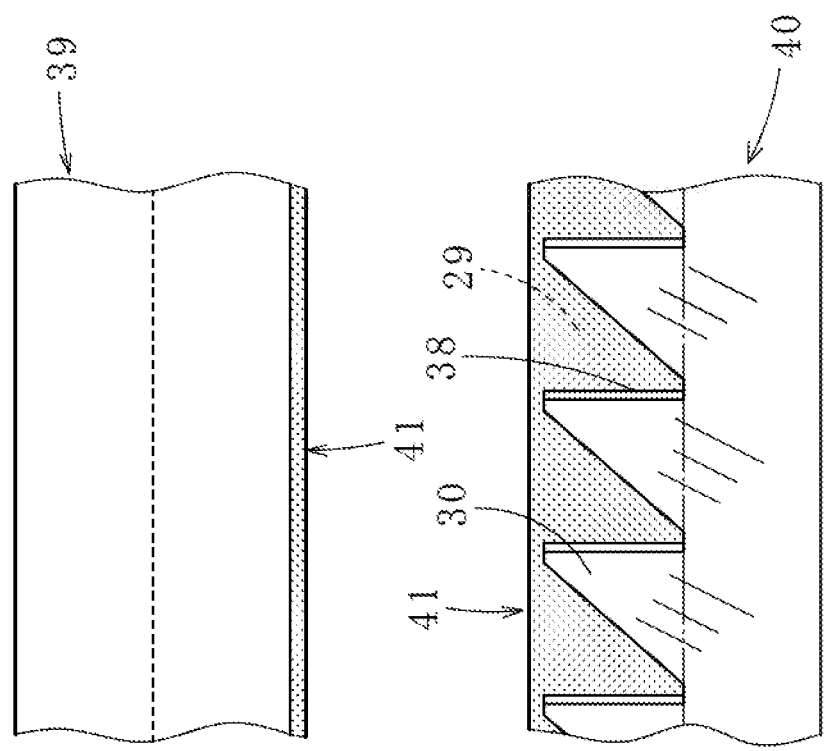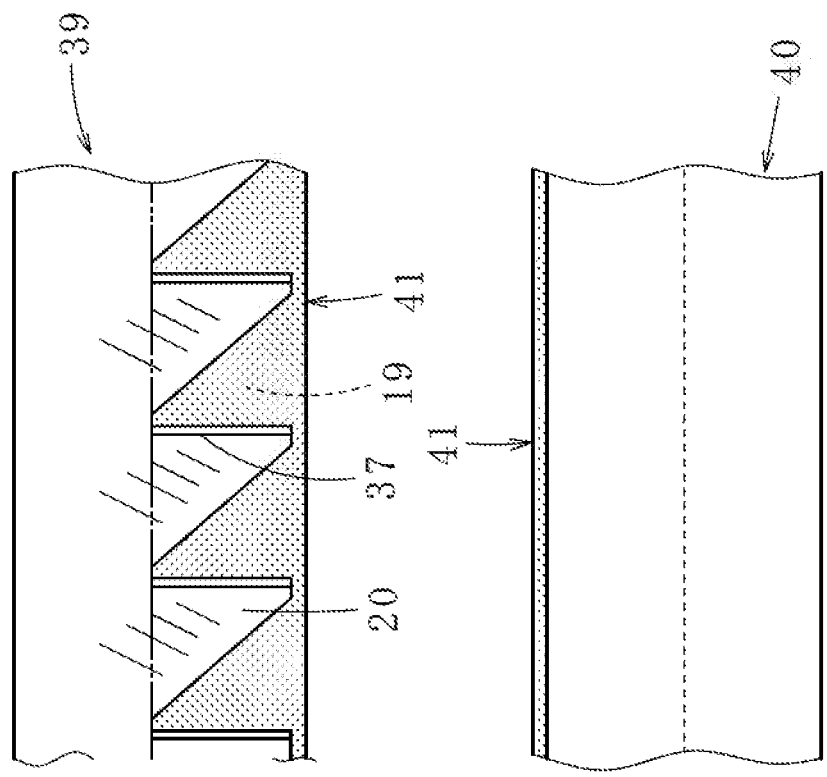

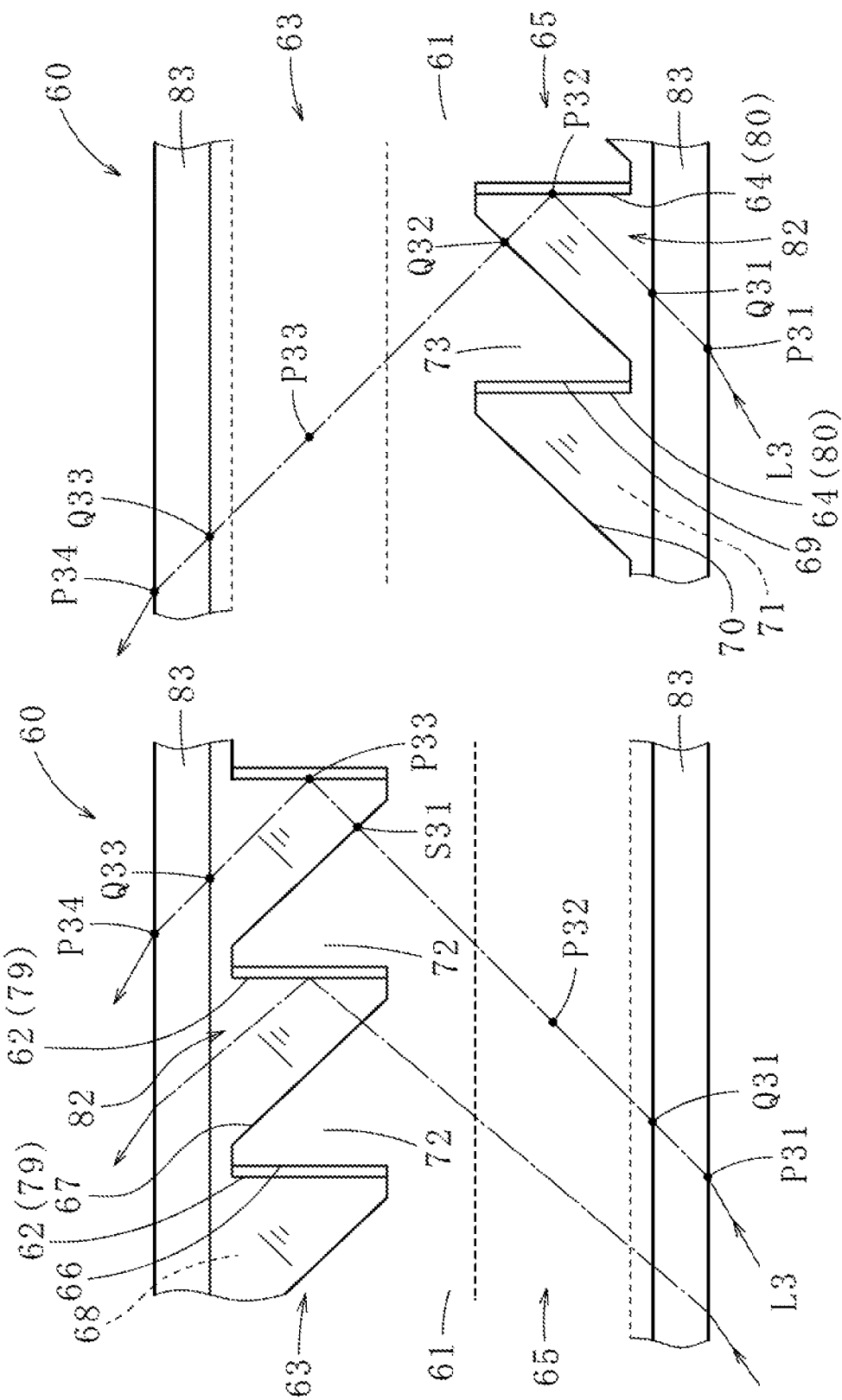

STEREOSCOPIC IMAGE FORMING DEVICE AND METHOD FOR MANUFACTURING STEREOSCOPIC IMAGE FORMING DEVICE

TECHNICAL FIELD

The present invention relates to a stereoscopic image forming device for forming a stereoscopic image in the air and a method for manufacturing the same.

BACKGROUND ART

As a device for forming a stereoscopic image by a light (scattered light) emitted from a surface of an object, for example, Patent Literature 1 discloses a stereoscopic image forming device (optical imaging device).

This imaging device includes two transparent flat plates having respectively first and second optical control panels inside thereof. Each of the first and second optical control panels is formed by vertically aligning a plurality of band-shaped light reflective surfaces made of metal reflective surfaces (mirror surfaces) at a constant pitch along a thickness direction of the transparent flat plate. The first and second optical control panels are closely attached with one side of the first optical control panel and one side of the second optical control panel facing each other such that the light reflective surfaces of the first optical control panel and the light reflective surfaces of the second optical control panel are perpendicular to each other when viewed from above.

CITATION LIST

Patent Literature

Patent Literature 1: International Publication Number WO 2009/131128

SUMMARY OF INVENTION

Technical Problem

In the manufacturing of the above-mentioned first and second optical control panels, a plurality of board-like transparent synthetic resin plates or glass plates (hereinafter also referred to as "transparent plates") of a constant thickness, each including the metal reflective surfaces formed on one side thereof is laminated to be a laminated body such that the metal reflective surfaces are arranged on one side of the laminated body. From this laminated body, each of the first and second optical control panels is cut out to have a cutting surface being vertical to each of the metal reflective surfaces.

Thus, a large-size vapor deposition furnace is required to form the metal reflective surfaces in the transparent plate. Specifically, it is necessary to repeat an operation one hundred times or more, in which one sheet or a small number of sheets of the transparent plates are put and deaerated in the vapor deposition furnace under high vacuum and processed through vapor deposition treatment, and then the vapor-deposited transparent plates are released to atmospheric pressure and taken out of the furnace. This operation requires an enormous time and effort. It is also necessary to perform operations, such as laminating the vapor-deposited transparent plates to form the laminated body and cutting the laminated body in a predetermined extremely thin thickness so as to cut out the first and second optical control panels, and polishing (both sides of) the cutting surfaces of the first and second optical control panels. These operations result in poor workabilities and manufacturing inefficiencies.

Further, as the plurality of the linearly-aligned (parallely-aligned) metal reflective surfaces of the first and second optical control panels are arranged perpendicular to each other when viewed from above, an arrangement interval (pitch) of the metal reflective surfaces is restricted, and thus not only a viewing angle (imaging range) but also illuminance or sharpness of an image are limited.

Still further, Patent Literature 1 also discloses an optical imaging device provided by forming first and second optical control panels including grooves each having a right triangular cross-section from transparent resin, arranging the first and second optical control panels to face each other such that reflective surfaces thereof are perpendicular to each other, and attaching closely the first and second optical control panels. However, this device uses total reflection from the reflective surfaces and an aspect ratio of the groove is small, which causes a problem of difficulties in forming a vivid image.

The present invention has been made in view of the above circumstances and it is an object of the present invention to provide a stereoscopic image forming device that has a wide viewing angle, can form a vivid and clear stereoscopic image with a few ghost image, and is comparatively easy to manufacture as well as a method for manufacturing the same.

Solution to Problem

To accomplish the above object, a first aspect of the present invention provides a stereoscopic image forming device to be formed in a ring shape or a shape partly using a ring shape when viewed from above, including: a plurality of first vertical light reflective members provided in one side of a transparent flat plate material, the first vertical light reflective members arranged radially around a reference point X; and a plurality of second vertical light reflective members provided in the other side of the transparent flat plate material, the second vertical light reflective members arranged in concentric circles centered at a reference point Y overlapping on the reference point X when viewed from above, the concentric circles intersecting with the first vertical light reflective members.

As long as a final shape of the stereoscopic image forming device is the ring shape or the shape partly using the ring shape, an external shape of the device at manufacturing stage can be a ring shape, circular shape, or the other shapes. The shape partly using the ring shape includes a rectangular shape in addition to a fan shape.

In this device, the first vertical light reflective members (radial light reflective members) to be arranged radially around the reference point X are each formed in a linear shape whereas the second vertical light reflective members (concentric light reflective members) to be arranged concentrically are each curved along a concentric circle centered at the reference point Y, and the first and second vertical light reflective members are perpendicular to each other at a intersecting point of the both when viewed from above. Therefore, this device can form a stereoscopic image like the conventional stereoscopic image forming device in which the first and second optical control panels (or light control parts) with a plurality of linear band-like light reflection surfaces arranged in parallel are piled up with or without gaps (or are integrated with each other) such that each of the light reflection surfaces are perpendicular to each other when viewed from above.

It is suitable to use the first vertical light reflective member in which one side of the transparent flat plate material includes a plurality of grooves arranged radially with intervals and the vertical surfaces of the grooves are mirror-finished. It is also suitable to use the second vertical light reflective member in which the other side of the transparent flat plate material includes a plurality of grooves arranged concentrically with intervals and the vertical surfaces of the grooves are mirror-finished. Those can be produced from the transparent resin by press molding, injection molding, roll forming, or else. Alternatively, the grooves to be provided with the first and second vertical light reflective members can be formed in both sides (front and back sides) of one sheet of the transparent flat plate material simultaneously or formed in one side (front side) of each two sheets of the transparent flat plate materials separately and later joined together by the transparent adhesive. Here, the cross-sectional shape of the groove is formed in a rectangular shape, right triangular shape, trapezoidal shape, or else, and thereby the vertical surface can be easily obtained.

Particularly when the cross-sectional shape of the groove is formed in a right triangular shape or trapezoidal shape, the groove becomes wider towards an open end thereof and thus molding and demolding become easy, which achieves an excellent productivity. When the cross-sectional shape of the groove is formed in a rectangular shape, the vertical surfaces at both sides of the groove can be used as the light reflective members (hereinafter, the first and second vertical light reflective members are also referred to as "light reflective members" without distinction).

Further, two types of the light reflective members, the radial light reflective members and the concentric light reflective members, work as long as they are disposed by stacking vertically in a thickness direction of (one side and the other side of) the transparent flat plate material.

By mirror-polishing a surface of a mold used for molding to an extent that diffuse reflection of light is prevented, a surface of a transparent flat plate material to be processed becomes a similar mirror surface. Accordingly, when total reflection of light is utilized, the vertical surface of the groove as it is can be used as the light reflective member. In such case, however, if a width of the groove is increased, an area of the transparent flat plate material surface to be used for forming a stereoscopic image is decreased and a bright stereoscopic image cannot be obtained. In view of this, it is preferable to form cross-sections of the groove and the projection provided between the grooves in a right triangle shape and a trapezoidal shape, respectively. Further, after being formed by the mold, the vertical surface of the groove can be selectively provided with the metal reflection surface (mirror surface) through, for example, metal deposition so as to be used as the light reflective member. Still further, instead of arranging the second vertical light reflective members concentrically, one groove or a plurality of grooves can be spirally formed to provide the second vertical light reflective members. In addition, instead of forming the groove in the surface of the transparent flat plate material by molding, the groove can be formed by scraping the surface of the transparent flat plate material.

In the stereoscopic image forming device according to the first aspect of the present invention, it is preferable that each of the first and second vertical light reflective members be a metal reflective surface.

As a method of forming the metal reflective surface (mirror surface), the vertical surface of the groove can be processed directly by sputtering, metal deposition, metal-microparticle spraying, ion-beam irradiation, metal-paste painting, or else. Other than these methods, a resin film provided with a reflection coating formed by sputtering, metal deposition, or else can be pasted to the vertical surface of the groove. Particularly when processing the vertical surface of the groove in a triangular cross-section directly by sputtering, metal deposition, metal-microparticle spraying, ion-beam irradiation or else, the inclined surface of the groove preferably includes a depressed surface in which a cross-section thereof sinks inwardly and a polygonal surface (formed by a part of polygon) in addition to a plane surface. This can prevent a metal reflective surface from being formed on the inclined surface of the groove as much as possible.

In the stereoscopic image forming device according to the first aspect of the present invention, it is preferable that both surfaces of the stereoscopic image forming device be flat plate-shaped, and a material for the stereoscopic image forming device except for the first and second vertical light reflective members be made of two or more types of transparent resins having an equal refractive index or approximate refractive indexes.

Here, the refractive index of one transparent resin is preferably within a range of 0.8 to 1.2 times (more preferably 0.9 to 1.1 times, further more preferably 0.95 to 1.05 times) the refractive index of the other transparent resin.

In the stereoscopic image forming device according to the first aspect of the present invention, it is preferable that each of the first and second vertical light reflective members be a total reflective surface.

In the stereoscopic image forming device according to the first aspect of the present invention, it is preferable that a gas layer or a vacuum be used for the first and second vertical light reflective members.

In the stereoscopic image forming device according to the first aspect of the present invention, it is preferable that one side of the transparent flat plate material include a plurality of triangular cross-sectional first grooves each having a vertical surface and a inclined surface and a plurality of triangular cross-sectional first projections each formed in between the adjacent first grooves, each of the first grooves and projections arranged radially around the reference point X; the other side of the transparent flat plate material include a plurality of triangular cross-sectional second grooves each having a vertical surface and a inclined surface and a plurality of triangular cross-sectional second projections each formed in between the adjacent second grooves, each of the second grooves and projections arranged concentrically around the reference point Y; each of the vertical surfaces of the first and second grooves be provided with the metal reflective surface; and each of the first and second grooves be filled with a transparent resin having a refractive index equal to or approximate to a refractive index of the transparent flat plate material.

In the stereoscopic image forming device according to the first aspect of the present invention, it is preferable that one side of the transparent flat plate material include a plurality of trapezoidal cross-sectional first projections each having a vertical surface and a inclined surface and a plurality of triangular cross-sectional first grooves each formed in between the adjacent first projections, each of the first projections and grooves arranged radially around the reference point X; the other side of the transparent flat plate material include a plurality of trapezoidal cross-sectional second projections each having a vertical surface and a inclined surface and a plurality of triangular cross-sectional second grooves each formed in between the adjacent second projections, each of the second projections and grooves arranged concentrically around the reference point Y; and the vertical surfaces of the first and second projections be total reflection surfaces using the gas layer or the vacuum.

To accomplish the above object, a second aspect of the present invention provides a method for manufacturing a stereoscopic image forming device to be formed in a ring shape or a shape partly using a ring shape when viewed from above, including:

a first process of producing a first mold base material from a first transparent resin by any one of press molding, injection molding, or roll forming, the first mold base material including a transparent flat plate material, one side of the transparent flat plate material including a plurality of triangular cross-sectional grooves each having a vertical surface and a inclined surface and a plurality of triangular cross-sectional projections each formed in between the adjacent grooves, each of the grooves and projections arranged radially around a reference point X;

a second process of producing a second mold base material from a second transparent resin by any one of press molding, injection molding, or roll forming, the second mold base material including a transparent flat plate material, one side of the transparent flat plate material including a plurality of triangular cross-sectional grooves each having a vertical surface and a inclined surface and a plurality of triangular cross-sectional projections each formed in between the adjacent grooves, each of the grooves and projections arranged concentrically around a reference point Y;

a third process of selectively forming metal reflective surfaces being first and second vertical light reflective members only on the vertical surfaces of the grooves of the first and second mold base materials and thereby producing first and second intermediate base materials; and a fourth process of filling the grooves of the first and second intermediate base materials with a third transparent resin having a refractive index equal to or approximate to refractive indexes of the first and second transparent resins, and laminating and joining the first and second intermediate base materials in a manner that the reference points X and Y are arranged to overlap each other when viewed from above while the grooves of the first and second intermediate base materials are arranged to face each other.

The refractive indexes $\eta 1$ and $\eta 2$ of the first and second transparent resins are preferably the same, and the refractive index $\eta 3$ of the third transparent resin is within a range of 0.8 to 1.2 times (more preferably 0.9 to 1.1 times, further more preferably 0.95 to 1.05 times) the refractive indexes $\eta 1$ and $\eta 2$ of the first and second transparent resins.

In the fourth process, while placing the sheet-shaped third transparent resin with a melting point lower than those of the first and second transparent resins in between the first and second intermediate base materials, the first and second intermediate base materials with the third transparent resin can be heated and pressed in vacuum to melt only the third transparent resin and to fill and cure the melted third transparent resin in the grooves of the first and second intermediate base materials. Alternatively, the transparent adhesive (made of the third transparent resin) can be filled and cured in the grooves of the first and second intermediate base materials while matching the first and second intermediate base materials such that the projections of the first and second intermediate base materials face each other. As the transparent adhesive, in addition to a photo-curable adhesive to be cured by irradiation with, for example, ultraviolet rays, a thermosetting adhesive or two-part adhesive can be used. Particularly, to make the refractive index $\eta 3$ closer to the refractive indexes $\eta 1$ and $\eta 2$, an optical adhesive, or else, made of an adjustable refractive index resin, the refractive index of which is adjusted, is suitably used.

To accomplish the above object, a third aspect of the present invention provides a method for manufacturing a stereoscopic image forming device to be formed in a ring shape or a shape partly using a ring shape when viewed from above, including:

a first process of producing a first mold base material from a first transparent resin by any one of press molding, injection molding, or roll forming, the first mold base material including a transparent flat plate material, one side of the transparent flat plate material including a plurality of triangular cross-sectional grooves each having a vertical surface and a inclined surface and a plurality of triangular cross-sectional projections each formed in between the adjacent grooves, each of the grooves and projections arranged radially around a reference point X;

a second process of producing a second mold base material from a second transparent resin by any one of press molding, injection molding, or roll forming, the second mold base material including a transparent flat plate material, one side of the transparent flat plate material including a plurality of triangular cross-sectional grooves each having a vertical surface and a inclined surface and a plurality of triangular cross-sectional projections each formed in between the adjacent grooves, each of the grooves and projections arranged concentrically around a reference point Y;

a third process of selectively forming metal reflective surfaces being first and second vertical light reflective members only on the vertical surfaces of the grooves of the first and second mold base materials and thereby producing first and second intermediate base materials;

a fourth process of filling the grooves of the first intermediate base material with a third transparent resin having a refractive index equal to or approximate to a refractive index of the first transparent resin and flattening a surface of the third transparent resin, and thereby forming a first light control section;

a fifth process of filling the grooves of the second intermediate base material with a fourth transparent resin having a refractive index equal to or approximate to a refractive index of the second transparent resin and flattening a surface of the fourth transparent resin, and thereby forming a second light control section; and a sixth process of stacking the first and second light control sections on top of each other with or without a gap in a manner that the reference points X and Y are arranged to overlap each other when viewed from above.

The refractive index $\eta 3$ of the third transparent resin is within a range of 0.8 to 1.2 times (more preferably 0.9 to 1.1 times, further more preferably 0.95 to 1.05 times) the refractive index $\eta 1$ of the first transparent resin. Additionally, the refractive index $\eta 4$ of the fourth transparent resin is within a range of 0.8 to 1.2 times (more preferably 0.9 to 1.1 times, further more preferably 0.95 to 1.05 times) the refractive index $\eta 2$ of the second transparent resin. Preferably, the first and second transparent resins are the same materials and the third and fourth transparent resins are the same materials, however, can be different materials.

In the fourth process, the sheet-shaped third transparent resin with a melting point lower than that of the first transparent resin can be heated and pressed in vacuum to melt only the third transparent resin and to fill and cure the same in the grooves of the first intermediate base material. Alternatively, the transparent adhesive (made of the third transparent resin) can be filled and cured in the grooves of the first intermediate base material. In the fifth process, the sheet-shaped fourth transparent resin with a melting point lower than that of the second transparent resin can be heated and pressed in vacuum to melt only the fourth transparent resin and to fill and cure the same in the grooves of the second intermediate base material.

Alternatively, the transparent adhesive (made of the fourth transparent resin) can be filled and cured in the grooves of the second intermediate base material. When the transparent adhesive is applied in the fourth and fifth processes, the same transparent adhesive according to the second aspect of the present invention is suitably used.

Since both surfaces of the first and second light control sections need to be plane to form a clear stereoscopic image, when the transparent adhesive is used in the fourth and fifth processes, it is preferable to flatten the surface of the cured resin by cutting, polishing, or else. Instead of such planarization, a transparent resin plate with a plane surface can be laminated on and joined to each surface of the first and second intermediate base materials with the grooves thereof filled with the transparent adhesive. Here, the transparent resin plate made of the same material as the first and second transparent resins is suitably used, however, it is possible to use a material with a refractive index within a range of 0.8 to 1.2 times (more preferably 0.9 to 1.1 times, further more preferably 0.95 to 1.05 times) the refractive indexes $\eta 1$ and $\eta 2$ of the first and second transparent resins.

To accomplish the above object, a fourth aspect of the present invention provides a method for manufacturing a stereoscopic image forming device to be formed in a ring shape or a shape partly using a ring shape when viewed from above, including:

a first process of producing a mold base material from a first transparent resin by any one of press molding, injection molding, or roll forming, the mold base material including a transparent flat plate material, one side of the transparent flat plate material including a plurality of triangular cross-sectional first grooves each having a vertical surface and a inclined surface and a plurality of triangular cross-sectional first projections each formed in between the adjacent first grooves, each of the first grooves and projections arranged radially around a reference point X, the other side of the transparent flat plate material including a plurality of triangular cross-sectional second grooves each having a vertical surface and a inclined surface and a plurality of triangular cross-sectional second projections each formed in between the adjacent second grooves, each of the second grooves and projections arranged concentrically around a reference point Y overlapping the reference point X when viewed from above;

a second process of selectively forming metal reflective surfaces being first and second vertical light reflective members only on the vertical surfaces of the first and second grooves of the mold base material and thereby producing an intermediate base material; and a third process of filling the first and second grooves of the intermediate base material with a second transparent resin having a refractive index equal to or approximate to a refractive index of the first transparent resin and flattening a surface of the second transparent resin.

The refractive index $\eta 2$ of the second transparent resin is within a range of 0.8 to 1.2 times (more preferably 0.9 to 1.1 times, further more preferably 0.95 to 1.05 times) the refractive index $\eta 1$ of the first transparent resin.

In the third process, the sheet-shaped second transparent resin with a melting point lower than that of the first transparent resin can be heated and pressed in vacuum to melt only the first transparent resin and to fill and cure the same in the first and second grooves of the intermediate base material. Alternatively, the transparent adhesive (made of the second transparent resin) can be filled and cured in the first and second grooves of the intermediate base material. When the transparent adhesive is applied in the third process, the same transparent adhesive according to the second aspect of the present invention is suitably used.

Since both surfaces of the stereoscopic image forming device need to be plane to form a clear stereoscopic image, when the transparent adhesive is used in the third process, it is preferable to flatten the surface of the cured resin by cutting, or polishing. Instead of such planarization, a transparent resin plate with a plane surface can be laminated on and joined to each surface of the intermediate base material while the first and second grooves thereof filled with the transparent adhesive. Here, the transparent resin plate made of the same material as the first transparent resin is suitably used, however, it is possible to use a material with a refractive index within a range of 0.8 to 1.2 times (more preferably 0.9 to 1.1 times, further more preferably 0.95 to 1.05 times) the refractive index $\eta 1$ of the first transparent resin.

To accomplish the above object, a fifth aspect of the present invention provides a method for manufacturing a stereoscopic image forming device to be formed in a ring shape or a shape partly using a ring shape when viewed from above, including:

a process of producing a molded body from a transparent resin by any one of press molding, injection molding, or roll forming, the molded body including a transparent flat plate material, one side of the transparent flat plate material including a plurality of trapezoidal cross-sectional first projections each having a vertical surface being a first vertical light reflective member and a inclined surface and a plurality of triangular cross-sectional first grooves each formed in between the adjacent first projections, each of the first projections and grooves arranged radially around a reference point X, the other side of the transparent flat plate material including a plurality of trapezoidal cross-sectional second projections each having a vertical surface being a second vertical light reflective member and a inclined surface and a plurality of triangular cross-sectional grooves each formed in between the adjacent second projections, each of the second projections and grooves arranged concentrically around a reference point Y overlapping the reference point X when viewed from above.

Advantageous Effects of Invention

As the stereoscopic image forming device according to the first aspect of the present invention is provided with a plurality of the radial light reflective members and vertical light reflective members, an imaging range is wide and a lot of light reflective members can be closely arranged with a fine pitch therebetween, and thus a viewing angle can be increased and a vivid and clear stereoscopic image can be obtained with few ghost image.

When the light reflective member is the metal reflective surface, an incidence angle of a light has no limitation and a lot of reflection lights are obtained, and thus an image is formed in a wide scope and a bright stereoscopic image can be obtained.

When the both sides of the stereoscopic image forming device are flat and plane and the materials of the parts except for the light reflective members are made of two or more types of the transparent resins having the same or close refractive index, an influence of refraction at the transparent resin interface is too small to cause a phenomenon, such as total reflection or spectrum, and thus a clear stereoscopic image can be obtained with few distortion.

When the light reflective member is the total reflection surface, it is not necessary to form the metal reflective surface on the vertical surface of the groove, which can simplify a structure.

When the light reflective member is the total reflection surface using the gas layer or the vacuum, it is not necessary to fill the transparent resin in the inside of the groove. Particularly with the gas layer, production man-hours can be reduced, achieving excellent mass-productivities.

In the method for manufacturing the stereoscopic image forming device according to the second to fourth aspects of the present invention, the mold base material produced by any one of press molding, injection molding, or roll forming is used and the mold base material is provided with a plurality of the grooves having the vertical surfaces and the inclined surfaces. This groove becomes wider towards an open end thereof and thus molding and demolding of the groove become easy, which makes it possible to relatively inexpensively manufacture the stereoscopic image forming device with a high aspect ratio defined by: a depth of the groove/a width of the groove.

Further, by filling the groove with the transparent resin with the refractive index equivalent or close to that of the transparent resin used for molding the mold base material, the influence of refraction at the inclined surface can be extremely minimized, which makes it possible to manufacture the high quality stereoscopic image forming device that can form a clear stereoscopic image with few distortion.

In the method for manufacturing the stereoscopic image forming device according to the fifth aspect of the present invention, the molded body produced by any one of press molding, injection molding, or roll forming can be used as it is, which achieves easy molding and demolding and the high aspect ratio of the groove, and further, eliminates the need to form the metal reflective surface and to fill the groove with the transparent resin. Accordingly, it is possible to manufacture the stereoscopic image forming device with an extremely simple structure that can form a vivid clear stereoscopic image and can achieve excellent mass-productivities.

BRIEF DESCRIPTION OF DRAWINGS

FIG. 3(A) is a front sectional view showing a first process of a method for manufacturing the stereoscopic image forming device.

FIG. 3(B) is a side sectional view showing a second process of the method for manufacturing the stereoscopic image forming device.

FIGS. 5(A) and 5(B) are front and side sectional views showing a fourth process of the method for manufacturing the stereoscopic image forming device, respectively.

FIGS. 10(A) and 10(B) are front and side sectional views of a stereoscopic image forming device according to a third embodiment of the present invention, respectively.

DESCRIPTION OF EMBODIMENTS

Figure 1:
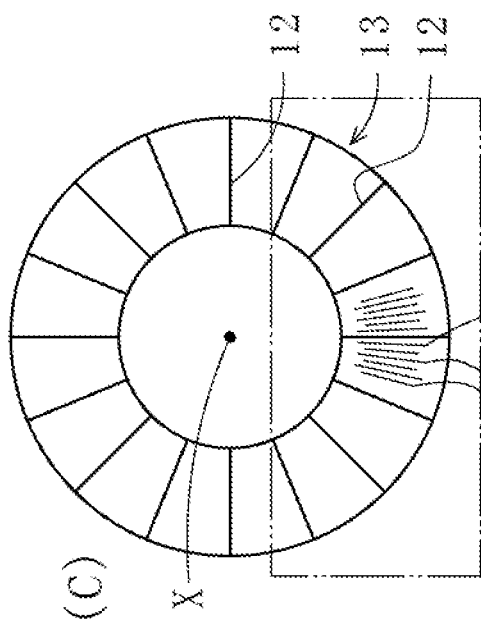
FIGS. 1(A) and 1(B) are front and plan views of a stereoscopic image forming device according to a first embodiment of the present invention, respectively.
FIG. 1(C) is a view taken on arrows A-A' of FIG. 1(A).
FIG. 1(D) is a view taken on arrows B-B' of FIG. 1(A).
Figure 1:
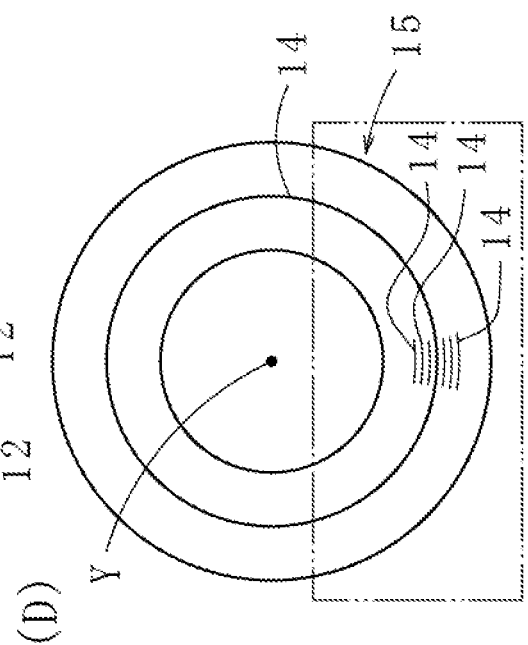
Figure 1:
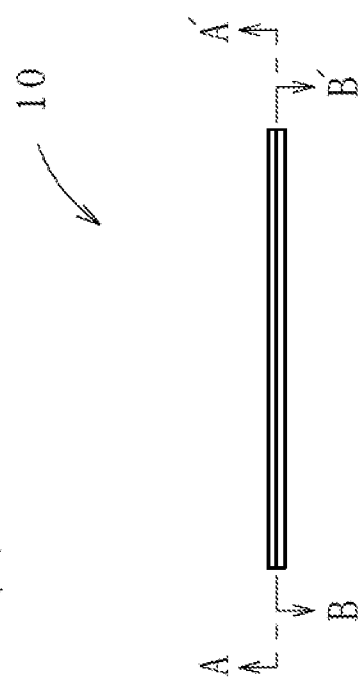
Figure 1:
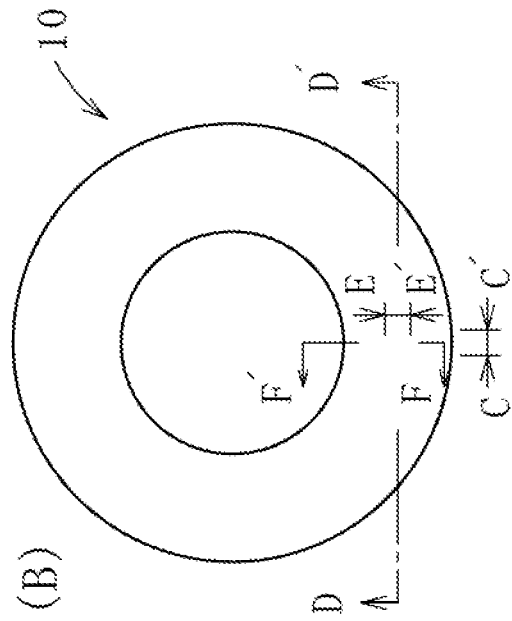

A stereoscopic image forming device and a method for manufacturing the same according to embodiments of the present invention will be described referring to the accompanying drawings.

As shown in FIGS. 1(A) to 1(D), a stereoscopic image forming device 10 according to a first embodiment of the present invention includes a first light control section 13 having an annular shape when viewed from above and provided with a plurality of radial light reflective members (first vertical light reflective members) 12 arranged radially around a reference point X, and a second light control section 15 having an annular shape when viewed from above and provided with a plurality of concentric light reflective members (second vertical light reflective members) 14 arranged concentrically around a reference point Y overlapping on the reference point X when viewed from above. The stereoscopic image forming device 10 forms a stereoscopic image of an object by reflecting light from the object off the radial light reflective members 12 and the concentric light reflective members 14, in which each of the radial light reflective members 12 and each of the concentric light reflective members 14 are orthogonal at a point where the radial light reflective member 12 and the concentric light reflective member 14 are crossed when viewed from above.

The radial light reflective members 12 and the concentric light reflective members 14 are all arranged at a pitch of, for example, 200 to 1000 μm or preferably 200 to 300 μm, however, FIGS. 1(C) and 1(D) show only a part of the radial light reflective members 12 and the concentric light reflective members 14. It is preferable to arrange the radial light reflective members 12 and the concentric light reflective members 14 at an equal pitch, however, it is possible to arrange the same at different pitches. Here, preferably, a length r of the radial light reflective member 12 with respect to a radius R of a circularly-formed outline of the first light control section 13 is within a range where r=(0.2 to 0.8)R. In addition, as the pitch of the radial light reflective members 12 becomes narrower as the radial light reflective members 12 get closer to the reference point X, the radial light reflective members 12 can be arranged while partially thinned out if need arises.

Although the stereoscopic image forming device 10 is formed in the annular shape when viewed from above, an area to be actually used for forming a stereoscopic image is a part surrounded with a rectangular shape with a two-dot chain line in FIGS. 1(C) and 1(D). Thus, in a manufacturing stage, it is possible to form the annular shape first as shown in FIGS. 1(A) to 1(D) and then to cut out a part of the annular shape as a stereoscopic image forming device (the same applies to below-described embodiments). Therefore, if a manufacturing outline is upsized, a plurality of stereoscopic image forming devices can be cut out, which can improve productivity. In addition, by increasing a diameter of the outline, a curvature radius of each of the concentric light reflective members can be increased and thus a distortion of a stereoscopic image due to curvature can be reduced. In this case, an external shape of a stereoscopic image forming device to be cut out can be appropriately selected from a rectangular shape or a fan-like shape other than the part of the annular shape.

The stereoscopic image forming device 10 will be explained in detail.

Figure 2:
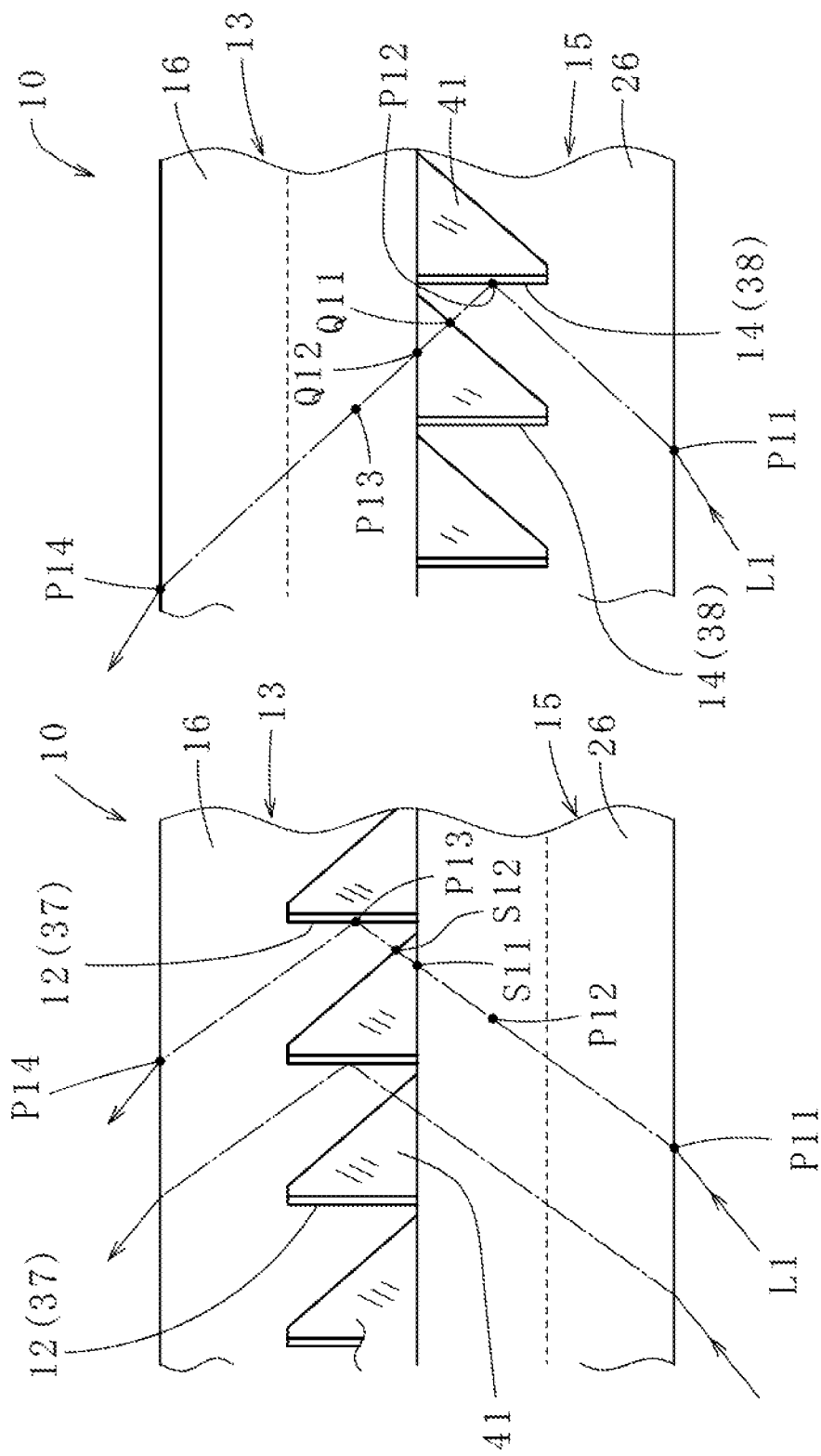
FIG. 2(A) is a cross-sectional view of a portion C-C' taken on arrows D-D' of FIG. 1(B).
FIG. 2(B) is a cross-sectional view of a portion E-E' taken on arrows F-F' of FIG. 1(B).

Here, each of the concentric light reflective members is curved along a concentric circle centered at the reference point Y but can be considered as straight in a minute range, and thus, FIG. 2(A) shows a front sectional view of an enlarged portion C-C' taken on arrows D-D' of FIG. 1(B) in a plane (straight) state. Also, FIG. 2(B) shows a side sectional view of a 90-degree turned portion E-E', which is along the radial light reflective members 12, taken on arrows F-F' of FIG. 1(B) (the same shall apply hereinafter).

In manufacturing of the stereoscopic image forming device 10, as shown in FIG. 3(A), a first mold base material 21 made of a first transparent resin (refractive index η1) is produced by injection molding (or molded by pressing or rolling) such that the first mold base material 21 is formed with a plurality of grooves 19 and a plurality of projections 20, and the grooves 19 and the projections 20 are each arranged radially in a top side (one side) of a transparent flat plate material 16 around the reference point X (refer to FIG. 1(C)). Each of the grooves 19 having a triangular cross section includes a vertical surface 17 and an inclined surface 18, and each of the projections 20 having a triangular cross section is formed between the adjacent grooves 19. As the first transparent resin, it is preferable to use a thermoplastic resin of comparatively high melting point, for example, ZEONEX (ZEONEX: Registered Trademark, Glass transition temperature: 120 to 160° C., Refractive index η1: 1.535, cyclo olefin polymer). In addition, as the transparent resin, a thermoplastic resin such as poly methyl methacrylate (acrylic resin), amorphous fluororesin, PMMA, optical polycarbonate, fluorine polyester, or polyether sulfone can be used, but it is preferable to use a thermoplastic resin of particularly high melting point and transparency.

The first mold base material 21 after molding is preferably processed by annealing treatment for relief of residual stress or the like. As shown in FIG. 3(A), between a lower end of the vertical surface 17 and a lower end of the inclined surface 18 of the groove 19 as well as between an upper end of the vertical surface 17 and an upper end of the inclined surface 18 of the groove 19, micro flat sections 23 and 24 are formed, respectively. A width of each of the micro flat sections 23 and 24 is preferably, for example, approximately 0.01 to 0.1 times a pitch w of the projection 20. Here, the pitch w of the projection 20 is equivalent to the pitch of the radial light reflective members 12, and is 200 to 1000 μm or preferably 200 to 300 μm. By forming these kinds of micro flat sections 23 and 24, the groove 19 and the projection 20 can achieve excellent shape stability and excellent reliability in dimensional control.

Further, a depth d of the groove 19 is preferably (0.8 to 5)w. Owing to this, a light reflective member with an aspect ratio (mirror surface height d/mirror surface pitch w) of 0.8 to 5 is obtained (hereinabove is a first process).

As shown in FIG. 3(B), a second mold base material 31 made of a second transparent resin (refractive index η2) is produced by injection molding (or molded by pressing or rolling) such that the second mold base material 31 is formed with a plurality of grooves 29 and a plurality of projections 30, and the grooves 29 and the projections 30 are each arranged concentrically in a top side (one side) of a transparent flat plate material 26 around the reference point Y (refer to FIG. 1(D)). Each of the grooves 29 having a triangular cross section includes a vertical surface 27 and an inclined surface 28, and each of the projections 30 having a triangular cross section is formed between the adjacent grooves 29. As the second transparent resin, it is preferable to use the same resin as the first transparent resin.

The second mold base material 31 after molding is preferably processed by annealing treatment for relief of residual stress or the like. As shown in FIG. 3(B), between a lower end of the vertical surface 27 and a lower end of the inclined surface 28 of the groove 29 as well as between an upper end of the vertical surface 27 and an upper end of the inclined surface 28 of the groove 29, micro flat sections 33 and 34 are formed, respectively. A width of each of the micro flat sections 33 and 34 is preferably, for example, approximately 0.01 to 0.1 times a pitch w of the projection 30. Here, the pitch w of the projection 30 is equivalent to the pitch of the concentric light reflective members 14, and is 200 to 1000 μm or preferably 200 to 300 μm. By forming these kinds of micro flat sections 33 and 34, the groove 29 and the projection 30 can achieve excellent shape stability and excellent reliability in dimensional control.

Further, a depth d of the groove 29 is preferably (0.8 to 5)w. Owing to this, a light reflective member with an aspect ratio (mirror surface height d/mirror surface pitch w) of 0.8 to 5 is obtained (hereinabove is a second process).

Figure 4:
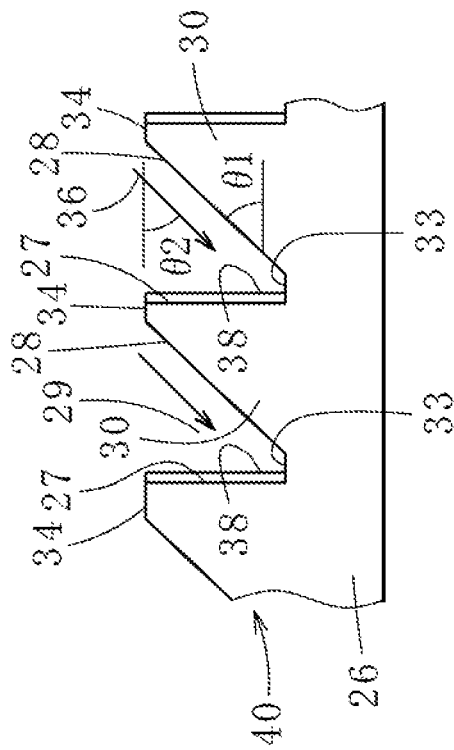
FIGS. 4(A) and 4(B) are front and side sectional views showing a third process of the method for manufacturing the stereoscopic image forming device, respectively.
Figure 4:
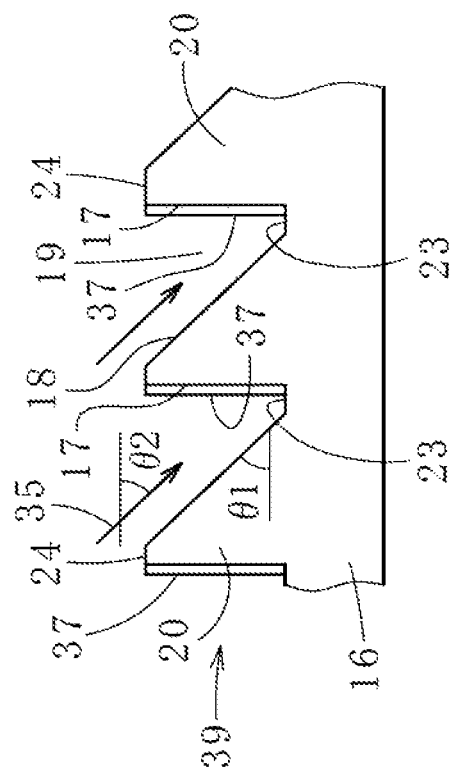

As shown in FIGS. 4(A) and 4(B), metal reflective surfaces (mirror surfaces) 37 and 38 are formed selectively on the vertical surfaces 17 and 27 of the grooves 19 and 29 of the first and second base materials 21 and 31. On the inclined surfaces 18 and 28 the metal reflective surfaces are not formed but the inclined surfaces 18 and 28 are processed to remain in a transparent state. In this selective formation of the metal reflective surfaces 37 and 38 on the vertical surfaces 17 and 27, metal particles are irradiated onto the vertical surfaces 17 and 27 in a vacuum or under low pressure from a diagonal direction along the inclined surfaces 18 and 28 such that the metal particles are to be parallel to the inclined surfaces 18 and 28 or such that the inclined surfaces 18 and 28 are to be shadowed by the projections 20 and 30, specifically by spattering, metal deposition, metal-microparticle spraying, ion-beam irradiation, or other methods. Here, irradiation directions 35 and 36 (angle θ2) of the metal particles are preferably set lower than an angle θ1 of the inclined surfaces 18 and 28 to a minimum extent (i.e. θ1>θ2). Since the micro flat sections 23 and 33 are respectively formed in between the lower end of the vertical surface 17 and the lower end of the inclined surface 18 of the groove 19 and in between the lower end of the vertical surface 27 and the lower end of the inclined surface 28 of the groove 29, the metal particles can be uniformly irradiated to the lower end of the vertical surfaces 17 and 27 while reducing or avoiding the metal particles to be attached to the inclined surfaces 18 and 28.

Further, in practice, the vertical surfaces 17 of the grooves 19 are radially arranged and the vertical surfaces 27 of the grooves 29 are concentrically arranged. Thus, it is preferable to irradiate the metal particles while rotating the first and second base materials 21 and 31 respectively around the reference points X and Y (refer to FIGS. 1(C) and 1(D)).

Through the above-described processes, only the vertical surfaces 17 and 27 are mirror-finished to form the metal reflective surfaces 37 and 38 as being the radial light reflective member 12 of the first light control section 13 and the concentric light reflective member 14 of the second light control sections 15, and intermediate base materials 39 and 40 are manufactured (hereinabove is a third process).

Still further, if the metal particles are attached to the micro flat sections 24 and 34, the micro flat sections 24 and 34 become mirror surfaces. Thus, it is preferable to remove metal attachments from the micro flat sections 24 and 34 or to process the micro flat sections 24 and 34 to be non-transparent or non-reflective.

In this embodiment, since the inclined surfaces 18 and 28 of the grooves 19 and 29 of the first and second base materials 21 and 31 are flat surfaces, sometimes the metal particles are attached also to the inclined surfaces 18 and 28 to a minimum extent when mirror-finishing the vertical surfaces 17 and 27. In view of this, the inclined surface can be provided with a polygonal surface or an arc-shaped depressed surface in a position dented from a flat surface connecting the lower end of the vertical surface 17 or 27 and the upper end of the projection 20 or 30. Alternatively, the inclined surface can be provided with an uneven surface having a plurality of micro roughness and unevenness. Molding and demolding the inclined surface provided with the polygonal surface, the depressed surface, or the uneven surface in an inwardly dented side of the projection are easy, and the inclined surface like this can effectively prevent the metal particles from being attached to the inclined surface when mirror-finishing the vertical surface. Here, the uneven surface having the plurality of micro unevenness can be easily produced by forming through shot blasting, matt finishing, or else the plurality of micro unevenness on a surface of a part of a mold for forming the inclined surface in advance when manufacturing the mold used for molding the mold base material, and then transferring the micro unevenness onto a top surface of the first or second transparent resin to be the first or second mold base material when molding the same. Further, a shape of the depressed portion of the unevenness (roughness) is not limited to a spherical shape or polygonal shape but can be appropriately selected. The unevenness can be formed either regularly or irregularly, but the unevenness irregularly formed can further enhance an anchor effect. A depth of the depressed portion of the unevenness can be appropriately selected, but set as 5 to 50 μm or preferably approximately 10 to 30 μm. Still further, this unevenness can be formed not only on the flat surface of the inclined surface but also on the polygonal surface or the depressed surface of the inclined surface in combination.

The above-described inclined surface provided with the polygonal surface, the depressed surface, and/or the uneven surface can be applied to the other embodiments in the same manner. Therefore, hereinbelow, the inclined surfaces illustrated as flat surfaces in the drawings also refer to the inclined surfaces each provided with the polygonal surface, the depressed surface, and/or the uneven surface other than the flat surface.

Through the above-described processes, the first and second intermediate base materials 39 and 40 are formed. Then, as shown in FIGS. 5(A) and 5(B), the respective grooves 19 and 29 are filled with a transparent adhesive 41 as a third transparent resin with a refractive index η3, which is equivalent to or approximately close to the refractive index η1 or η2 of the first or second transparent resin. After that, the first and second intermediate base materials 39 and 40 are laminated and joined (glued) to be integrated with each other by setting the grooves 19 and 29 of the first and second intermediate base materials 39 and 40 facing each other and overlaying the reference point X on the reference point Y when viewed from above (refer to FIGS. 1(C) and 1(D)). Since the first and second intermediate base materials 39 and 40 are arc-shaped when viewed from above, the first and second intermediate base materials 39 and 40 can be easily aligned centering around the reference points X and Y. Further, since the grooves 19 and 29 respectively have the micro flat sections 23 and 33 at the bottom of the same, air bubbles easily escape and thus the grooves 19 and 29 can be thoroughly filled with the transparent adhesive 41. Still further, since the projections 20 and 30 respectively have the micro flat sections 24 and 34 at top parts of the same, the top parts are prevented from being cracked or deformed and the projections 20 and 30 can be abutted against each other for a certain application of pressure and a tight adhesion. Here, it is preferable to set the refractive index η3 of the transparent adhesive (third transparent resin) 41 within a range of 0.8 to 1.2 times (preferably 0.9 to 1.1 times, further preferably 0.95 to 1.05 times) the refractive index η1 or η2 of the first or second transparent resin. As the transparent adhesive 41, in addition to a photo-curable adhesive to be cured by irradiation with, e.g., ultraviolet rays, a thermosetting adhesive or two-part adhesive can be used. Particularly, to make the refractive index η3 closer to the refractive indexes η1 and η2, for example, an optical adhesive made of an adjustable refractive index resin, the refractive index of which is adjusted, is suitably used.

When provided with the polygonal, depressed or uneven surface, the inclined surface of each groove is excellent in adhesion with the transparent adhesive (third transparent resin) to be filed in the groove. Particularly, when provided with a lot of unevenness, the inclined surface can improve the adhesion with the anchor effect. This can solve the unevenness by filling an inside of the groove tightly with the transparent adhesive (third transparent resin). As a result, lights can pass through an interface between the inclined surface and the third transparent resin while preventing diffuse reflection (diffusion) and a clear vivid stereoscopic image can be obtained with minimized refractions (hereinabove is a fourth process).

In the above-described fourth process, the transparent adhesive 41 is used as the third transparent resin, however, a sheet-like transparent resin can be used instead of the transparent adhesive 41.

Figure 6:
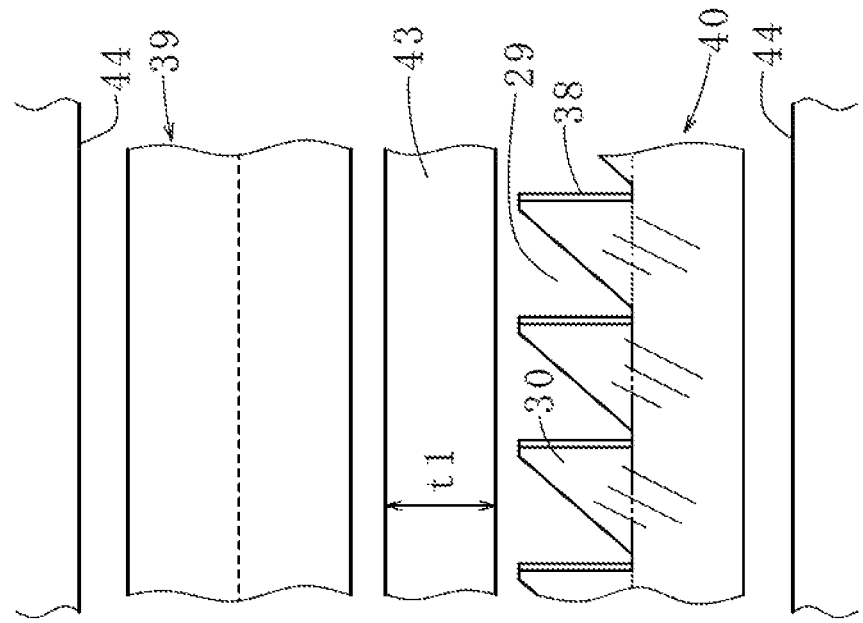
FIGS. 6(A) and 6(B) are front and side sectional views showing modification examples of the fourth process of the method for manufacturing the stereoscopic image forming device, respectively.
Figure 6:
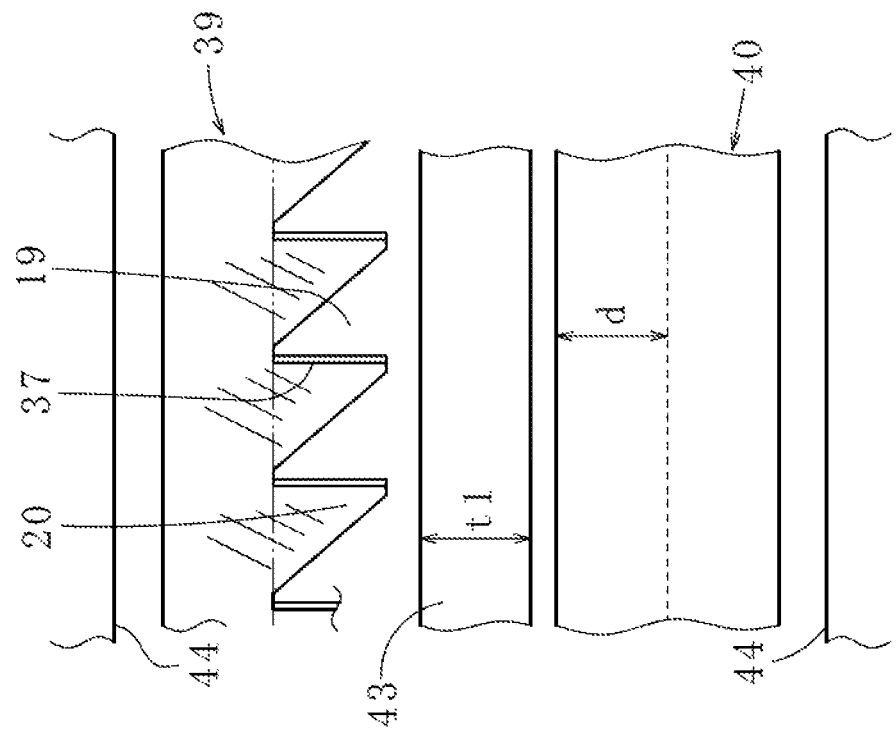

As shown in FIGS. 6(A) and 6(B), while the projections 20 and 30 of the first and second intermediate base materials 39 and 40 are set to face each other, a transparent resin sheet (third transparent resin) 43 is inserted in between the first and second intermediate base materials 39 and 40. The transparent resin sheet 43 has a melting point lower than those of the first and second transparent resins and a refractive index η3 equivalent or closer to the refractive index η1 or η2 of the first or second transparent resin. Then, the first and second intermediate base materials 39 and 40 with the transparent resin sheet 43 inserted are arranged in between flat presses 44 having a heating mechanism and pressed while heated in a vacuum state (specifically, put inside a vacuum furnace). By this, the transparent resin sheet 43 is solely melted, filled and cured in the grooves 19 and 29 of the first and second intermediate base materials 39 and 40, and thus the first and second intermediate base materials 39 and 40 can be integrated.

As the transparent resin sheet (third transparent resin) 43, for example, ZEONOR (ZEONOR: Registered Trademark, Glass transition temperature: 100 to 102° C., Refractive index η3: 1.53, cyclo olefin polymer) is preferably used, however, a transparent resin other than ZEONOR can be alternatively used if the transparent resin has a melting point lower than that of the first or second transparent resin, a high transparency, and a refractive index η3 within a range of 0.8 to 1.2 times (preferably 0.9 to 1.1 times, further preferably 0.95 to 1.05 times) the refractive index η1 or η2 of the first or second transparent resin.

If an amount of the resin inside the grooves 19 and 29 is insufficient, a space is formed. Thus, it is preferable to set a thickness t1 of the transparent resin sheet 43 to an extent where the melted transparent resin is poured over the grooves 19 and 29. Accordingly, the thickness t1 of the transparent resin sheet 43 has to be selected such that a volume of the melted transparent resin sheet 43 becomes equal to or greater than a volume of the space in the grooves 19 and 29. For example, the thickness t1 of the transparent resin sheet 43 with respect to a depth d of the grooves 19 and 29 can be set as: t1>d (more specifically, 2d>t1>d). By setting as this, the grooves 19 and 29 can be completely filled with the third transparent resin.

Referring to FIGS. 2(A) and 2(B), an operation of the above-described stereoscopic image forming device 10 will be explained. A light L1 from an unillustrated object enters from P11 to the second light control section 15 and reflects at P12 of the concentric light reflective member 14 formed by the metal reflective surface 38. The light reflected at P12 enters to the first light control section 13, reflects at P13 of the radial light reflective member 12 formed by the metal reflective surface 37, comes out into the air from a point P14 of the first light control section 13, and then forms an image.

As shown in FIG. 2(B), a light enters from the second transparent resin (transparent flat plate material 26) to the third transparent resin (transparent adhesive 41) at Q11, and enters from the third transparent resin (transparent adhesive 41) to the first transparent resin (transparent flat plate material 16) at Q12. As shown in FIG. 2(A), a light enters from the second transparent resin (transparent flat plate material 26) to the third transparent resin (transparent adhesive 41) at S11, and enters from the third transparent resin (transparent adhesive 41) to the first transparent resin (transparent flat plate material 16) at S12. Since the refractive indexes η1 and η2 of the first and second transparent resins are approximately the same as the refractive index η3 of the third transparent resin, a phenomenon such as total reflection or spectrum is not happened and also an influence of refraction is extremely small. Here, a light is refracted at points P11 and P14 but such refraction at P11 and P14 is to be offset. In addition, both top and back sides (right and left sides in FIGS. 2(A) and 2(B)) of the radial light reflective member 12 and the concentric light reflective member 14 function as light reflective members.

A stereoscopic image forming device and a method for manufacturing the same according to a second embodiment of the present invention will be described.

Figure 7:
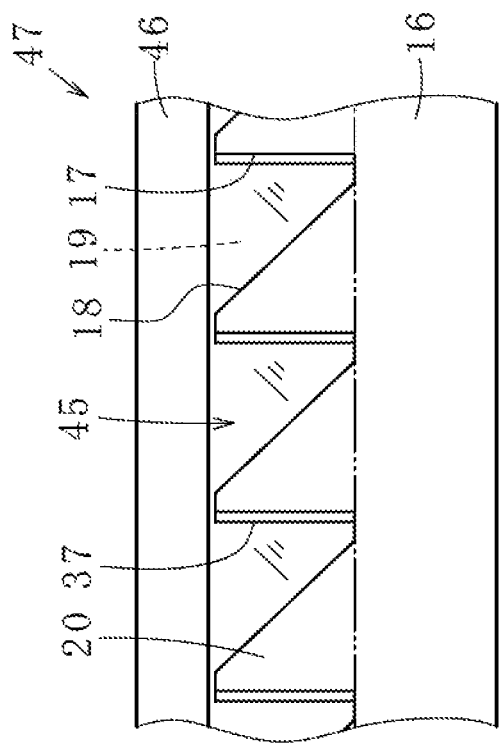
FIGS. 7(A) and 7(B) are front sectional views showing a fourth process of a method for manufacturing a stereoscopic image forming device according to a second embodiment of the present invention.
Figure 7:
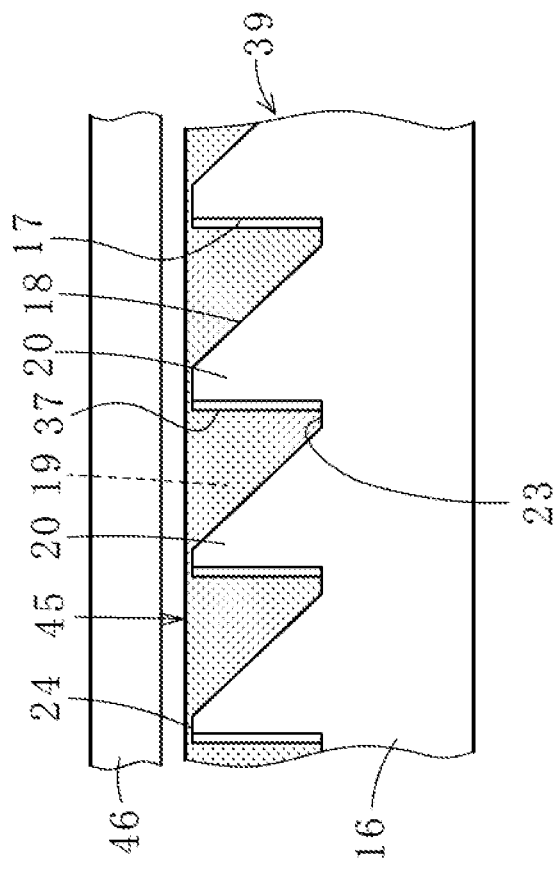

By the same method for manufacturing the stereoscopic image forming device according to the first embodiment, through the first to third processes as shown in FIGS. 3(A), 3(B), 4(A), and 4(B), the first and second intermediate base materials 39 and 40 are manufactured. Then, as shown in FIG. 7(A), a transparent adhesive 45 as the third transparent resin with the refractive index η3 equivalent or close to the refractive index η1 of the first transparent resin is filled in the groove 19 of the first intermediate base material 39, and a transparent resin plate 46 having a flat surface is laminated thereon. The transparent adhesive 45 is cured to join the first intermediate base material 39 and the transparent resin plate 46, and thus a first light control section 47 as shown in FIG. 7(B) is obtained (hereinabove is a fourth process).

Figure 8:
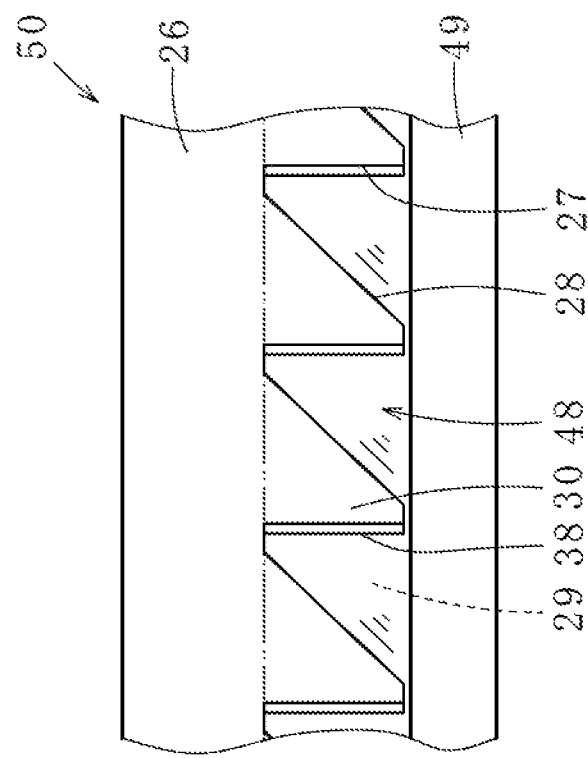
FIGS. 8(A) and 8(B) are side sectional views showing a fifth process of the method for manufacturing the stereoscopic image forming device.
Figure 8:
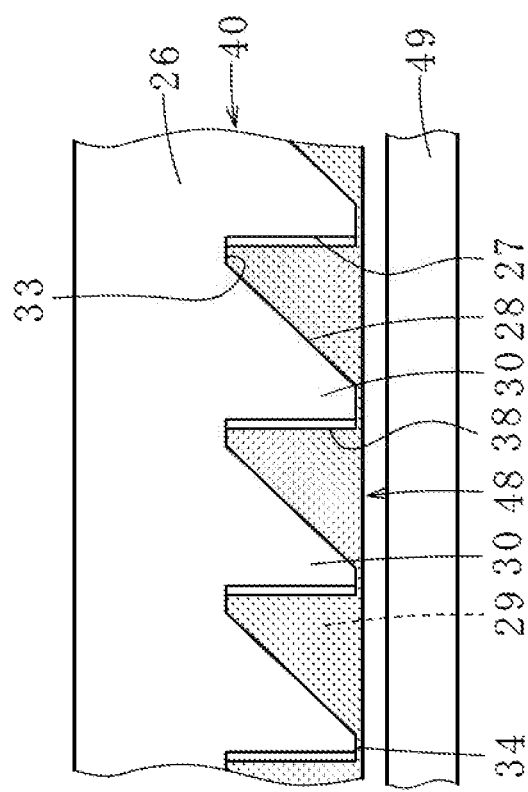

As shown in FIG. 8(A), a transparent adhesive 48 as a fourth transparent resin with a refractive index η4 equivalent or close to the refractive index η2 of the second transparent resin is filled in the groove 29 of the second intermediate base material 40, and a transparent resin plate having a flat surface is laminated thereon. The transparent adhesive 48 is cured to join the second intermediate base material 40 and the transparent resin plate 49, and thus a second light control section 50 as shown in FIG. 8(B) is obtained (hereinabove is a fifth process).

In the above-described fourth and fifth processes, it is preferable to set the refractive indexes η3 and η4 of the transparent adhesives (third and fourth transparent resins) 45 and 48 within a range of 0.8 to 1.2 times (preferably 0.9 to 1.1 times, more preferably 0.95 to 1.05 times) the refractive indexes η1 and η2 of the first and second transparent resins. Additionally, it is suitable to use the transparent adhesives (third and fourth transparent resins) 45 and 48 as same as the transparent adhesive 41 according to the first embodiment.

Also in the above-described fourth and fifth processes, by laminating the transparent resin plates 46 and 49 on the first and second intermediate base materials 39 and 40, surfaces of the first and second light control sections 47 and 50 can be easily flattened (planarized). However, if surfaces of the cured transparent adhesives (third and fourth transparent resins) 45 and 48 can be flattened by cutting, or polishing, the transparent resin plates 46 and 49 can be omitted. As a material of the transparent resin plates 46 and 49, the same material as the first and second transparent resins is suitably used, however, a material with a refractive index within a range of 0.8 to 1.2 times (preferably 0.9 to 1.1 times, more preferably 0.95 to 1.05 times) the refractive indexes η1 and η2 of the first and second transparent resins can be alternatively used.

Figure 9:
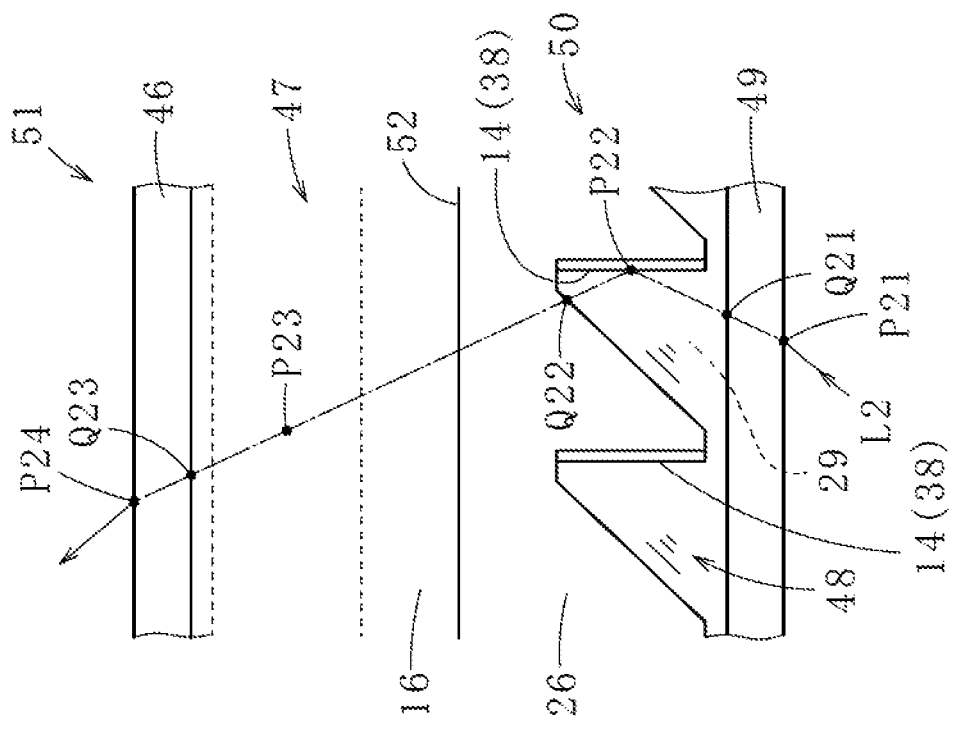
FIGS. 9(A) and 9(B) are front and side sectional views of the stereoscopic image forming device, respectively.
Figure 9:
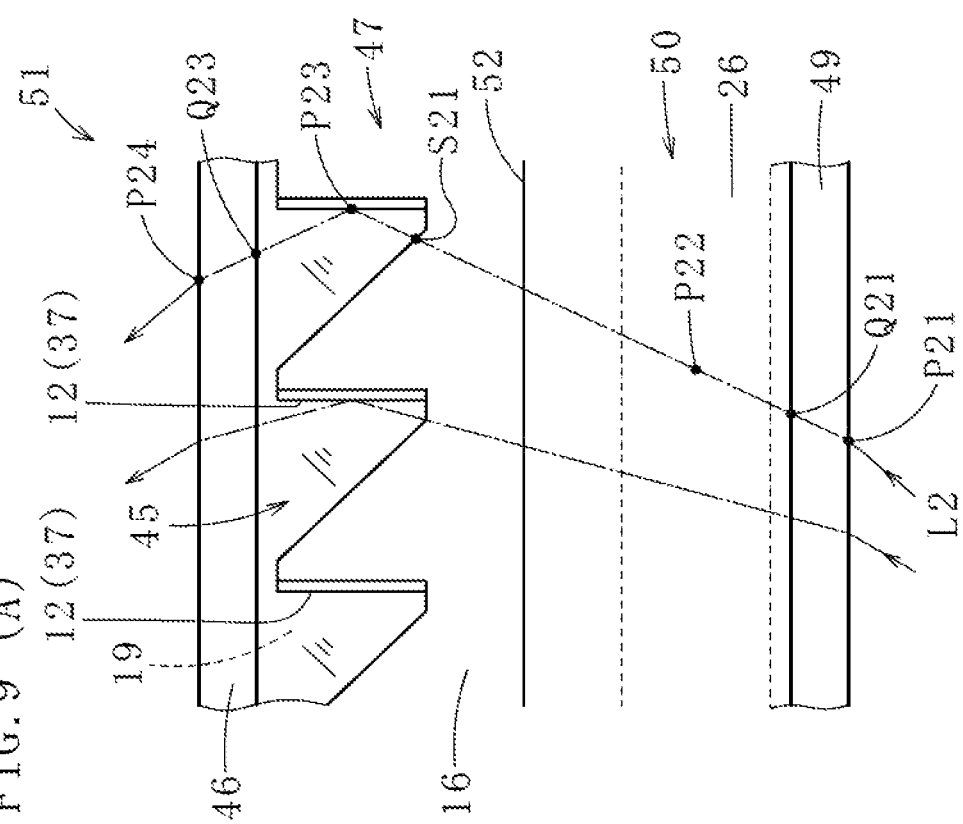

By laminating the first and second light control sections 47 and 50 produced in the fourth and fifth processes such that the respective reference points X and Y (refer to FIGS. 1(C) and 1(D)) overlap each other when viewed from above and connecting the first and second light control sections 47 and 50 by the transparent adhesive or the like (for example in vacuum), a stereoscopic image forming device 51 according to a second embodiment of the present invention as shown in FIGS. 9(A) and 9(B) can be completed. Like the first embodiment, the stereoscopic image forming device 51 includes the radial light reflective members 12 formed by the metal reflective surfaces 37 and the concentric light reflective members 14 formed by the metal reflective surfaces 38 (hereinabove is a sixth process).

The stereoscopic image forming device 51 manufactured through the above processes operates as follows: a light L2 from an unillustrated object enters from P21 to the second light control section 50 and reflects at P22 of the concentric light reflective member 14 formed by the metal reflective surface 38, the light reflected at P22 enters to the first light control section 47 and reflects at P23 of the radial light reflective member 12 formed by the metal reflective surface 37, and goes out into the air from the first light control section 47 at the position of P24 and forms an image.

As shown in FIG. 9(B), a light enters from the transparent resin plate 49 to the fourth transparent resin (transparent adhesive 48) at Q21, and enters from the fourth transparent resin (transparent adhesive 48) to the second transparent resin (transparent flat plate material 26) at Q22. As shown in FIG. 9(A), a light enters from the first transparent resin (transparent flat plate material 16) to the third transparent resin (transparent adhesive 45) at S21, and enters from the third transparent resin (transparent adhesive 45) to the transparent resin plate 46 at Q23. Since the refractive indexes η1 to η4 of the first to fourth transparent resins and the refractive indexes of the transparent resin plates 46 and 49 are approximately the same, a phenomenon, such as total reflection or spectrum, is not happened and also an influence of refraction is extremely small. Although a transparent adhesive layer 52 exists in between the first and second light control sections 47 and 50, a transparent adhesive, like the transparent adhesives 45 and 48, with a refractive index approximately the same as the refractive indexes η1 and η2 of the first and second transparent resins is to be used and a thickness of the transparent adhesive layer 52 is to be thin (5 to 50 μm). As a result, an influence of refraction of a light passing through the transparent adhesive layer 52 is extremely small and a phenomenon, such as total reflection, is not happened. Here, a light is refracted at points P21 and P24 but such refraction at P21 and P24 is to be offset. Further, both top and back sides (right and left sides in FIGS. 9(A) and 9(B)) of the radial light reflective member 12 and the concentric light reflective member 14 function as light reflective members.

Still further, in FIGS. 9(A) and 9(B), the back sides (where the grooves 19 and 29 are not formed) of the first and second light control sections 47 and 50 are laminated to face each other and joined, however, the top sides can be laminated to face each other and joined or the top side and the back side can be laminated to face each other and joined. In any cases, the radial light reflective members are located in one side of the finished stereoscopic image forming device and the concentric light reflective members are located in the other side of the same, and therefore a stereoscopic image can be formed without any difference in operation.

A stereoscopic image forming device and a method for manufacturing the same according to a third embodiment of the present invention will be described.

As shown in FIGS. 10(A) and 10(B), a stereoscopic image forming device 60 according to a third embodiment of the present invention includes a first light control part 63 having a plurality of radial light reflective members (first vertical light reflective members) 62 in one side (top side) of one sheet of a transparent flat plate material 61 and also includes a second light control part 65 having a plurality of concentric light reflective members (second vertical light reflective members) 64 in the other side (back side) of the transparent flat plate material 61.

As shown in FIGS. 10(A), 10(B), 11(A), and 11(B), the one side (top side) of the transparent flat plate material 61 includes a plurality of triangular cross-sectional first grooves 68 arranged radially around an unillustrated reference point X, each of the first grooves 68 has a vertical surface 66 and an inclined surface 67, and the other side (back side) of the transparent flat plate material 61 includes a plurality of triangular cross-sectional second grooves 71 arranged concentrically around an unillustrated reference point Y overlapping with the reference point X when viewed from above, each of the second grooves 71 has a vertical surface 69 and an inclined surface 70. Provided in between the adjoining first grooves 68 is a plurality of triangular cross-sectional first projections 72, and provided in between adjoining second grooves 71 is a plurality of triangular cross-sectional second projections 73.

Figure 11A:
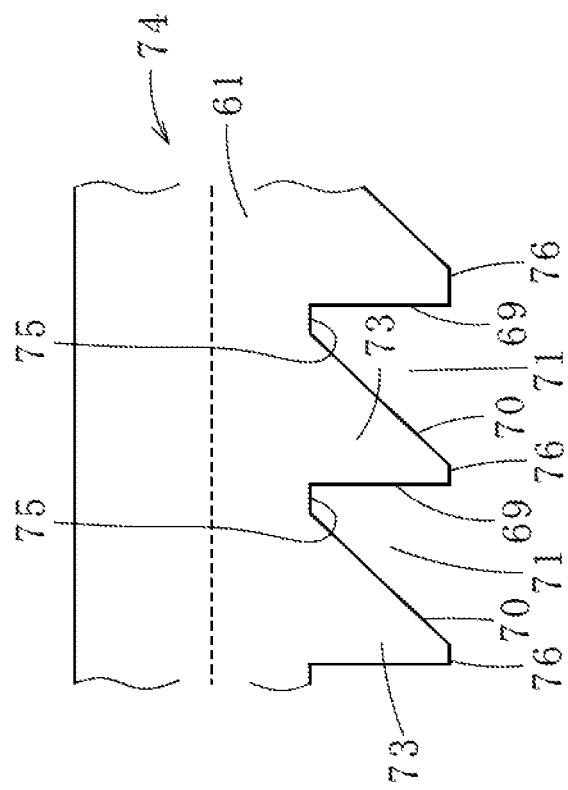
FIGS. 11(A) and 11(B) are front and side sectional views showing a first process of a method for manufacturing the stereoscopic image forming device, respectively.
Figure 11B:
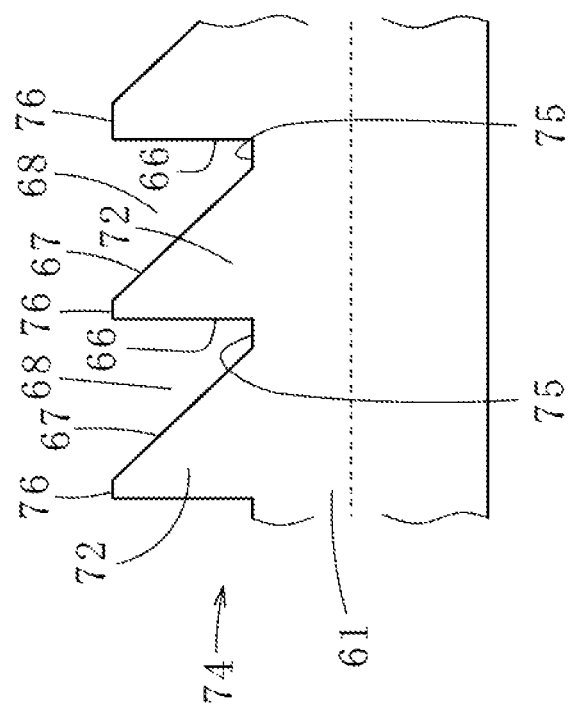

As shown in FIGS. 11(A) and 11(B), micro flat sections 75 are formed in between lower ends of the inclined surface 67 and the vertical surface 66 of the first groove 68 (a bottom of the first groove 68) and in between lower ends of the inclined surface 70 and the vertical surface 69 of the second groove 71 (a bottom of the second groove 71), and micro flat sections 76 are formed in between upper ends of the inclined surface 67 and the vertical surface 66 of the first groove 68 (a top of the first projection 72) and in between upper ends of the inclined surface 70 and the vertical surface 69 of the second groove 71 (a top of the second projection 73). The micro flat sections 75 and 76 have the same width as the micro flat sections 23 and 24 in the first embodiment.

When manufacturing the stereoscopic image forming device 60, firstly, a mold base material 74 is produced by molding a first transparent resin material (refractive index η1) through injection molding (or press molding or roll forming). Here, as the first transparent resin, it is suitable to use the material as same as the first and second transparent resins in the first embodiment. After the molding, like in the first embodiment, annealing treatment is preferably performed for relief of residual stress or the like (hereinabove is a first process).

Figure 12A:
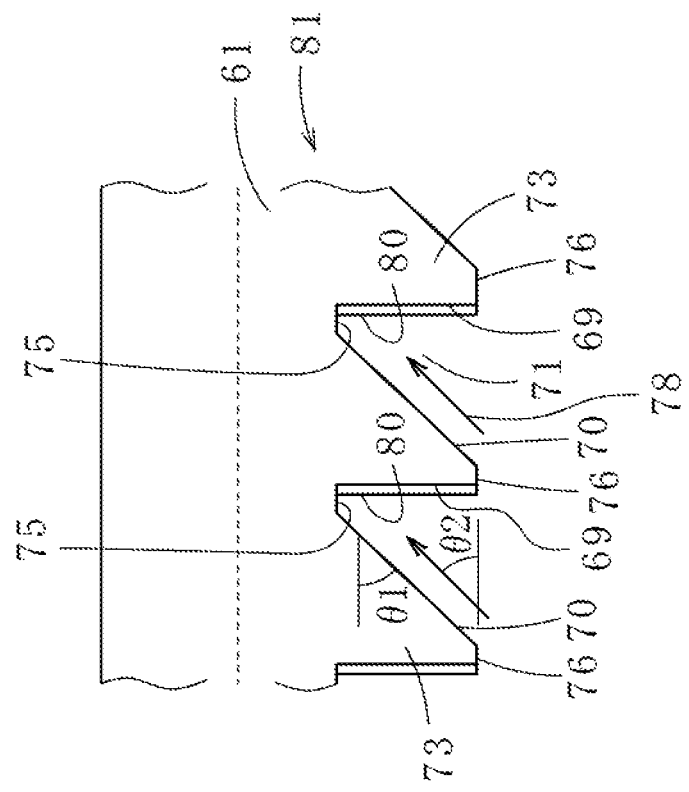
FIGS. 12(A) and 12(B) are front and side sectional views showing a second process of the method for manufacturing the stereoscopic image forming device, respectively.
Figure 12B:
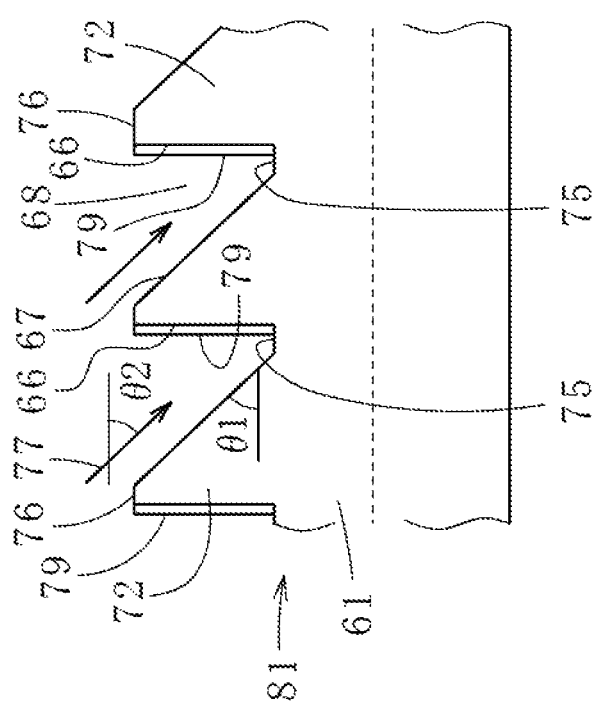

Secondly, as shown in FIGS. 12(A) and 12(B), metal reflective surfaces (mirror surfaces) 79 and 80 are selectively formed on the vertical surfaces 66 and 69 of the first and second grooves 68 and 71 of the mold base material 74. As this formation of the metal reflective surfaces 79 and 80, like in the first embodiment, it is suitable to use a method of irradiating metal particles by sputtering, etc. Here, a relationship between an angle θ1 of the inclined surfaces 67 and 70 and an irradiation direction (angle θ2) of the metal particles is also the same as in the first embodiment. By this, the metal reflective surfaces 79 and 80 being the radial light reflective member 62 and the concentric light reflective member 64 of the first and second light control parts 63 and 65 as shown in FIGS. 10(A) and 10(B) can be formed and thus an intermediate base material 81 is manufactured. In addition, between a side of the first light control part 63 and a side of the second light control part 65, the irradiation directions 77 and 78 of the metal particles are different. Thus, it is preferable to perform the irradiation of the metal particles separately from the side of the first light control part 63 and the side of second light control part 65 (hereinabove is a second process).

Figure 13A:
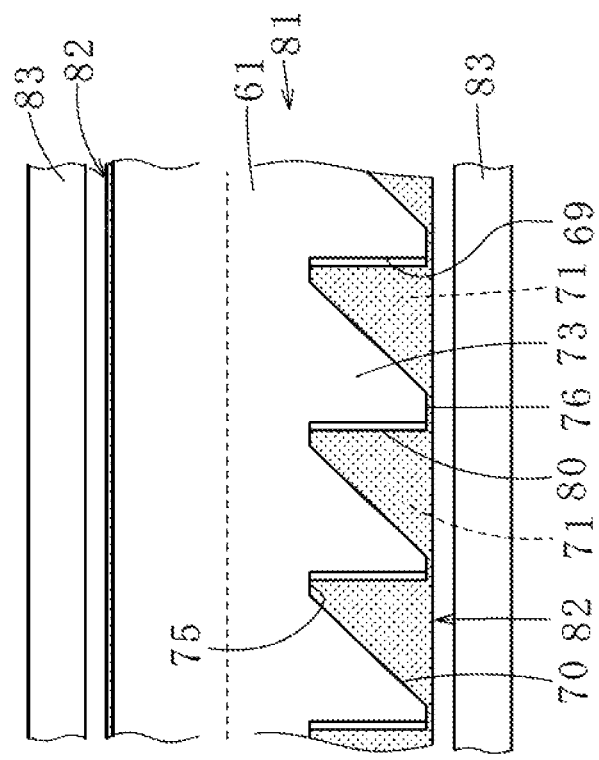
FIGS. 13(A) and 13(B) are front and side sectional views showing a third process of the method for manufacturing the stereoscopic image forming device, respectively.
Figure 13B:
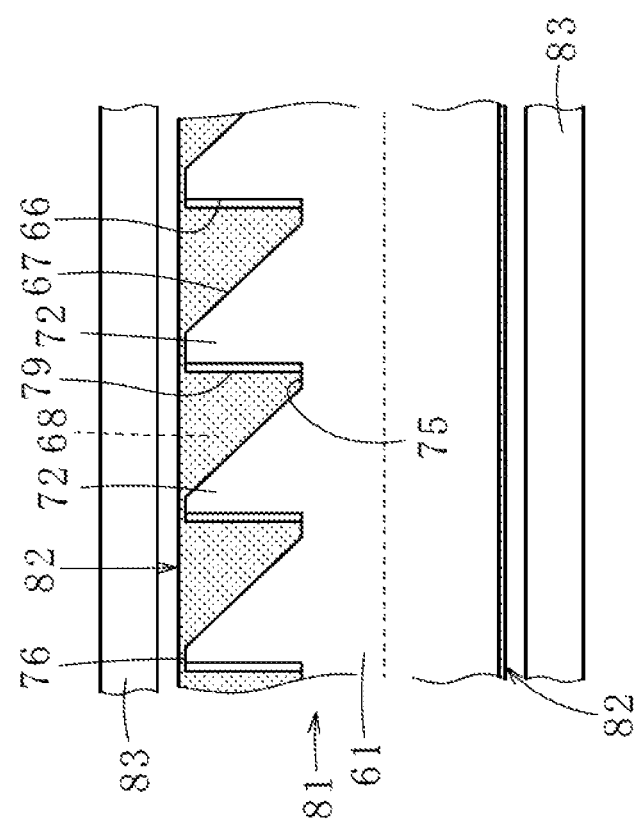

Thirdly, as shown in FIGS. 13(A) and 13(B), the first and second grooves 68 and 71 of the intermediate base material 81 are filled with a transparent adhesive 82 as a second transparent resin with the refractive index η2 equivalent or close to the refractive index η1 of the first transparent resin, and transparent resin plates 83 having a flat surface are laminated on both sides of the intermediate base material 81, then the transparent adhesive 82 is cured to join the intermediate base material 81 and the transparent resin plates 83 laminated on the both sides of the intermediate base material 81. That is how the stereoscopic image forming device 60 as shown in FIGS. 10(A) and 10(B) is manufactured (hereinabove is a third process).

In the above-described third process, the refractive index η2 of the transparent adhesive (second transparent resin) 82 is preferably within a range of 0.8 to 1.2 times (more preferably 0.9 to 1.1 times, further more preferably 0.95 to 1.05 times) the refractive index η1 of the first transparent resin. As the transparent adhesive (second transparent resin) 82, it is suitable to use the material as same as the transparent adhesive 41 in the first embodiment.

Also in the above-described third process, by laminating the transparent resin plates 83 on the both sides of the intermediate base material 81, both surfaces of the stereoscopic image forming device 60 can be easily flattened (planarized). However, if surfaces of the cured transparent adhesives (second transparent resin) 82 can be flattened by cutting, polishing, or else, the transparent resin plates 83 can be omitted. As a material of the transparent resin plates 83, the same material as the first transparent resin is suitably used, however, a material with a refractive index within a range of 0.8 to 1.2 times (preferably 0.9 to 1.1 times, more preferably 0.95 to 1.05 times) the refractive index η1 of the first transparent resin can be alternatively used.

Referring to FIGS. 10(A) and 10(B), an operation of the above-described stereoscopic image forming device 60 will be explained. A light L3 from an unillustrated object enters from P31 to the second light control part 65 and reflects at P32 of the concentric light reflective member 64 formed by the metal reflective surface 80. The light reflected at P32 enters to the first light control part 63, reflects at P33 of the radial light reflective member 62 formed by the metal reflective surface 79, comes out into the air from a point P34 of the first light control part 63, and then forms an image.

As shown in FIG. 10(B), a light enters from the transparent resin plate 83 to the second transparent resin (transparent adhesive 82) at Q31, and enters from the second transparent resin (transparent adhesive 82) to the first transparent resin (transparent flat plate material 61) at Q32. As shown in FIG. 10 (A), a light enters from the first transparent resin (transparent flat plate material 61) to the second transparent resin (transparent adhesive 82) at S31, and enters from the second transparent resin (transparent adhesive 82) to the transparent resin plate 83 at Q33. Since the refractive indexes η1 and η2 of the first and second transparent resins and the refractive index of the transparent resin plate 83 are approximately the same, a phenomenon such as total reflection or spectrum is not happened and also an influence of refraction is extremely small. Here, a light is refracted at points P31 and P34 but such refraction at P31 and P34 is to be offset. In addition, both top and back sides (right and left sides in FIGS. 10(A) and 10(B)) of the radial light reflective member 62 and the concentric light reflective member 64 function as light reflective members.

A stereoscopic image forming device and a method for manufacturing the same according to a fourth embodiment of the present invention will be described.

Figure 14A:
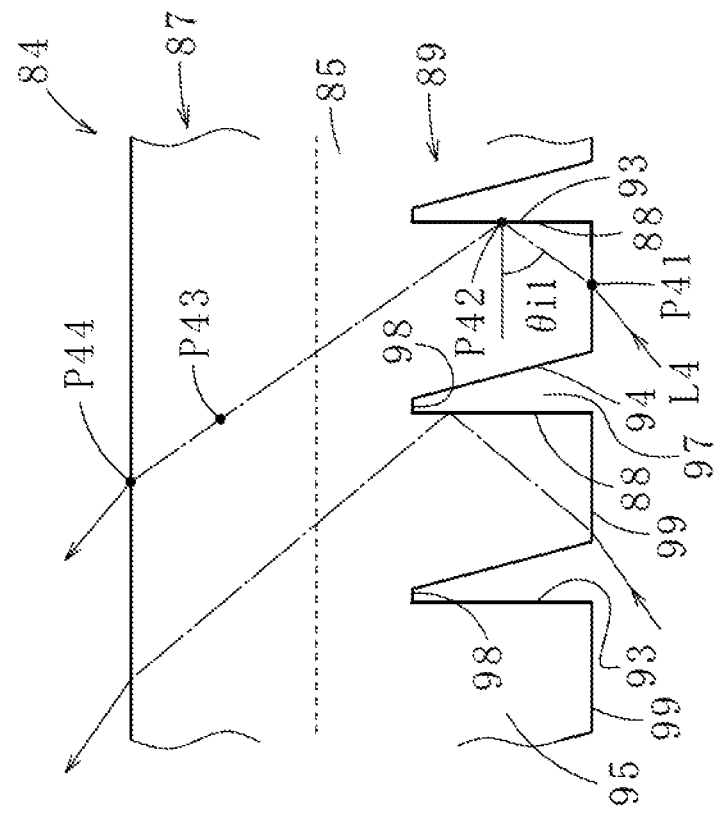
FIGS. 14(A) and 14(B) are front and side sectional views of a stereoscopic image forming device according to a fourth embodiment of the present invention, respectively.
Figure 14B:
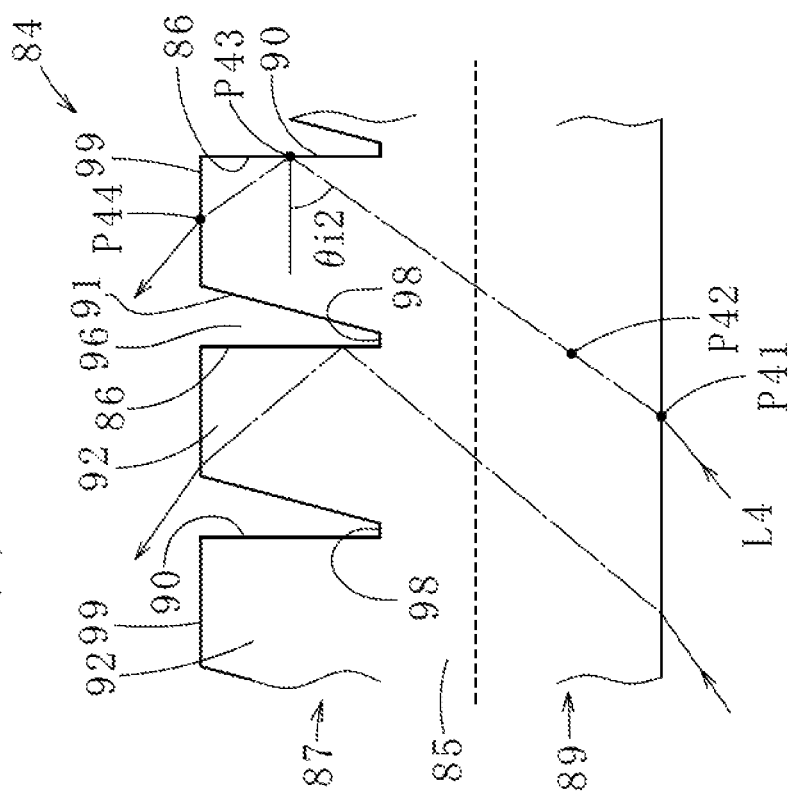

As shown in FIGS. 14(A) and 14(B), a stereoscopic image forming device 84 according to a fourth embodiment of the present invention, like in the third embodiment, includes a first light control part 87 having a plurality of radial light reflective members (first vertical light reflective members) 86 in one side of a transparent flat plate material 85 and also includes a second light control part 89 having a plurality of concentric light reflective members (second vertical light reflective members) 88 in the other side of the transparent flat plate material 85. The one side (top side) of the transparent flat plate material 85 includes a plurality of trapezoidal cross-sectional first projections 92 arranged radially around an unillustrated reference point X, each of the first projections 92 has a vertical surface 90 being a radial light reflective member 86 and an inclined surface 91, and the other side (back side) of the transparent flat plate material 85 includes a plurality of trapezoidal cross-sectional second projections 95 arranged concentrically around an unillustrated reference point Y overlapping with the reference point X when viewed from above, each of the second projections 95 has a vertical surface 93 being a concentric light reflective member 88 and an inclined surface 94. Provided in between the adjoining first projections 92 is a plurality of triangular cross-sectional first grooves 96, and provided in between adjoining second projections 95 is a plurality of triangular cross-sectional second grooves 97. Further, micro flat sections 98 are formed in between lower ends of the inclined surface 91 and the vertical surface 90 of the first projection 92 (a bottom of the first groove 96) and in between lower ends of the inclined surface 94 and the vertical surface 93 of the second projection 95 (a bottom of the second groove 97). The micro flat section 98 has the same width as the micro flat sections 23 and 24 in the first embodiment.

In the third embodiment, the metal reflective surfaces 79 and 80 are formed on the vertical surfaces 66 and 69 of the first and second grooves 68 and 71 to be functioned as the radial light reflective member 62 and the concentric light reflective member 64. However, in this embodiment, the vertical surfaces 90 and 93 of the first and second projections 92 and 95 are designed to be total reflection surfaces by using air layers (one example of gas layers) inside the first and second grooves 96 and 97, so that the vertical surfaces 90 and 93 as they are can function as the radial light reflective member 86 and the concentric light reflective member 88. As the first and second projections 92 and 95 each formed in a trapezoidal cross-section are each provided with a wide horizontal surface area 99, an area in a surface of the transparent flat plate material 85 to be used for forming a stereoscopic image can be prevented from being reduced and thus a clear stereoscopic image can be obtained.

When manufacturing the stereoscopic image forming device 84, like in the third embodiment, a transparent resin material is molded by injection molding (or press molding or roll forming). It is suitable to use the material as same as the first and second transparent resins in the first embodiment, however, the material is not limited thereto since the total reflection is applied. After the molding, like in the first embodiment, annealing treatment is preferably performed for relief of residual stress or the like.

In the stereoscopic image forming device 84, since the vertical surfaces 90 and 93 of the first and second projections 92 and 95 being the radial light reflective member 86 and the concentric light reflective member 88 are the total reflection surfaces using the air layers, it is not necessary to form the metal reflective surfaces in the vertical surfaces 90 and 93 or to fill the first and second grooves 96 and 97 with the transparent resin. Thus, a molded body molded by, for example, injection molding as it is can be used as the stereoscopic image forming device 84. Accordingly, the inclined surfaces 91 and 94 do not have to include polygonal surfaces, depressed surfaces, or uneven surfaces, but can be plane surfaces.

Also, in the stereoscopic image forming device 84, the first and second light control parts 87 and 89 can be simultaneously formed in the top and back sides of the one sheet of the transparent flat plate material 85 and thus it is easy to align the radial light reflective members 86 and the concentric light reflective members 88, which archives excellent productivities.

Referring to FIGS. 14(A) and 14(B), an operation of the above-described stereoscopic image forming device 84 will be explained. A light L4 from an unillustrated object enters from P41 on the horizontal surface area 99 of the second projection 95 to the second light control part 89. Here, air exists inside the second groove 97 (an external area of the vertical surface 93), and the refractive index $\eta 1$ of the transparent flat plate material 85 (inside the second projection 95) is larger than a refractive index $\eta a$ of the external area, i.e., the air layer, of the vertical surface 93. For this reason, when the light passing inside the second projection 95 enters to P42 on the vertical surface 93, if an incident angle $\theta i1$ of the light exceeds a critical angle $\theta c$, which meets a correlation of $\sin \theta c = \eta 1/\eta a$, an internal side of the vertical surface 93 becomes the total reflection surface and functions as the concentric light reflective member 88, and therefore the total reflection of the light happens at P42. The light reflected at P42 passes inside the transparent flat plate material 85 and enters into the first light control part 87 (inside the first projection 92). If an incident angle $\theta i2$ of the light reached at P43 on the vertical surface 90 exceeds the critical angle $\theta c$, as described above, an internal side of the vertical surface 90 becomes the total reflection surface and functions as the radial light reflective member 86, and therefore the total reflection of the light happens at P43. The light reflected at P43 goes out into the air from a position of P44 on horizontal surface area 99 of the first projection 92 and forms an image.

In this case, a light passing through the micro flat section 98 provided in the bottoms of the first and second grooves 96 and 97 is little and a lot of lights pass through the insides of the first and second projections 92 and 95. Accordingly, an amount of the light totally reflecting at the radial light reflective member 86 and the concentric light reflective member 88 can be increased, thereby forming a vivid clear stereoscopic image.

Here, a light is refracted at points P41 and P44 but such refraction at P41 and P44 is to be offset.

The present invention is not limited to the above-described embodiments but is applicable to such a case that a stereoscopic image forming device is manufactured by a combination of manufacturing methods of the same according to each of the embodiments.

In the present invention, the description is given on the stereoscopic image forming device including the radial light reflective members and the concentric light reflective members for the first and second vertical light reflective members as well as on the method for manufacturing the same. However, each manufacturing process according to the first to fourth embodiments is also applicable to, for example, a conventional stereoscopic image forming device, in which a plurality of vertical light reflection surfaces (band-shaped light reflection surfaces) of first and second light control panels (or light control parts) are linear (parallel) and arranged orthogonally to each other when viewed from above.

Particularly, the technique of forming in advance unevenness, by shot blasting, matt finishing, or else, on the surface of a part of a mold for forming the inclined surface of each of the grooves, and after that transferring the unevenness of the part of the mold onto the inclined surface of each of the grooves so that the inclined surface is provided with the unevenness thereon, aims not only to simplify demolding from the mold but also to improve the adhesion of the inclined surface of each of the grooves and the transparent resin to be filled in each of the grooves. Thus, this technique is useful for filling the inside of the grooves with the transparent resin when manufacturing the stereoscopic image forming device regardless of the shape or the alignment of the grooves.

In the first to third embodiments, the metal reflective surface (mirror surface) is formed by irradiating the metal particles to the vertical surface of each of the grooves by, for example, sputtering, however, the metal reflective surface can be formed by other methods like applying a metal paste.

In the sixth process of the second embodiment, the description is given on the case where the first and second light control sections are joined by using, for example, the transparent adhesive, however, the first and second light control sections can be used as the stereoscopic image forming device when being laminated with or without a gap.

In the fourth embodiment, the description is given on the case where the first and second light control parts are simultaneously molded in the both sides (top and back sides) of the one sheet of the transparent flat plate material, however, it is possible to separately mold the first and second light control parts in the two sheets of the transparent flat plate materials and join the same by, for example, the transparent adhesive. Further in the fourth embodiment, as the first and second grooves have open ends in the both sides of the stereoscopic image forming device, and thus, foreign materials, such as dusts, easily enter and accumulate, it is possible to cover the first and second grooves, for example, by joining transparent plates having a refractive index equivalent or close to that of the transparent flat plate material with the both sides of the stereoscopic image forming device, and then to form an air layer inside each of the grooves. Further, when separately molding the first and second light control parts in the two sheets of the transparent flat plate materials and joining the same by, for example, the transparent adhesive, the first and second grooves can be aligned to face each other so as to be sealed and to form an air layer inside each of the grooves. Still further, a gas such as nitrogen instead of air can be enclosed in the first and second grooves to form a gas layer, or internal areas of the first and second grooves can be vacuumed.

The concentric light reflective member according to the present invention includes not only a perfect circle but also a polygonal shape whose surfaces are each orthogonal to the radial light reflective member.

INDUSTRIAL APPLICABILITY

In the stereoscopic image forming device and the method for manufacturing the same according to the present invention, by providing a plurality of the radial light reflective members and a plurality of the concentric light reflective members, an imaging range can be wide and a lot of light reflective members can be closely arranged with a fine pitch therebetween, and thus a viewing angle can be increased and a vivid and clear stereoscopic image can be obtained with few ghost image, which is applicable to a 3D display device, a gaming device, play equipment, an advertising pillar, etc. Further, as the structure thereof is simple, the stereoscopic image forming device that is inexpensive and excels in mass-productivities can be manufactured.

REFERENCE SIGNS LIST

10: stereoscopic image forming device, 12: radial light reflective member (first vertical light reflective member), 13: first light control section, 14: concentric light reflective member (second vertical light reflective member), 15: second light control section, 16: transparent flat plate material, 17: vertical surface, 18: inclined surface, 19: groove, 20: projection, 21: first mold base material, 23, 24: micro flat section, 26: transparent flat plate material, 27: vertical surface, 28: inclined surface, 29: groove, 30: projection, 31: second mold base material, 33, 34: micro flat section, 35, 36: irradiation direction, 37, 38: metal reflective surface, 39: first intermediate base material, 40: second intermediate base material, 41: transparent adhesive (third transparent resin), 43: transparent resin sheet (third transparent resin), 44: flat press, 45: transparent adhesive (third transparent resin), 46: transparent resin plate, 47: first light control section, 48: transparent adhesive (fourth transparent resin), 49: transparent resin plate, 50: second light control section, 51: stereoscopic image forming device, 52: transparent adhesive layer, 60: stereoscopic image forming device, 61: transparent flat plate material, 62: radial light reflective member (first vertical light reflective member), 63: first light control part, 64: concentric light reflective member (second vertical light reflective member), 65: second light control part, 66: vertical surface, 67: inclined surface, 68: first groove, 69: vertical surface, 70: inclined surface, 71: second groove, 72: first projection, 73: second projection, 74: mold base material, 75,76: micro flat section, 77, 78: irradiation direction, 79, 80: metal reflective surface, 81: intermediate base material, 82: transparent adhesive (second transparent resin) 83: transparent resin plate, 84: stereoscopic image forming device, 85: transparent flat plate material, 86: radial light reflective member (first vertical light reflective member), 87: first light control part, 88: concentric light reflective member (second vertical light reflective member), 89: second light control part, 90: vertical surface, 91: inclined surface, 92: first projection, 93: vertical surface, 94: inclined surface, 95: second projection, 96: first groove, 97: second groove, 98: micro flat section, 99: horizontal surface area

The invention claimed is:

1. A stereoscopic image forming device to be formed in a ring shape or a shape partly using a ring shape when viewed from above, the stereoscopic image forming device configured to form in the air a stereoscopic image of an object by reflecting a light L from the object once off a first vertical light reflective member and once off a second vertical light reflective member while the light L passes through the stereoscopic image forming device, comprising:
a plurality of first vertical light reflective members provided in one side of a transparent flat plate material, the first vertical light reflective members each formed along a radius of a circle centered on a reference point X, the first vertical light reflective members arranged radially around the reference point X; and
a plurality of second vertical light reflective members provided in the other side of the transparent flat plate material, the second vertical light reflective members each curved along each of a plurality of concentric circles centered on a reference point Y overlapping on the reference point X when viewed from above, the second vertical light reflective members intersecting with the first vertical light reflective members when viewed from above.

2. The stereoscopic image forming device as defined in claim 1, wherein each of the first and second vertical light reflective members is a metal reflective surface.

3. The stereoscopic image forming device as defined in claim 2, wherein both surfaces of the stereoscopic image forming device are flat plate-shaped, and a material for the stereoscopic image forming device except for the first and second vertical light reflective members is made of two or more types of transparent resins having an equal refractive index or approximate refractive indexes.

4. The stereoscopic image forming device as defined in claim 3, wherein one side of the transparent flat plate material includes a plurality of triangular cross-sectional first grooves each having a vertical surface and an inclined surface and a plurality of triangular cross-sectional first projections each formed in between the adjacent first grooves, the plurality of first grooves and the plurality of first projections each formed along a radius of a circle centered on the reference point X; the other side of the transparent flat plate material includes a plurality of triangular cross-sectional second grooves each having a vertical surface and an inclined surface and a plurality of triangular cross-sectional second projections each formed in between the adjacent second grooves, the second grooves and projections each curved along each of a plurality of concentric circles centered on the reference point Y; each of the vertical surfaces of the first and second grooves is provided with the metal reflective surface; and each of the first and second grooves is filled with a transparent resin having a refractive index equal to or approximate to a refractive index of the transparent flat plate material.

5. The stereoscopic image forming device as defined in claim 1, wherein each of the first and second vertical light reflective members is a total reflective surface.

6. The stereoscopic image forming device as defined in claim 5, wherein a gas layer or a vacuum is used for the first and second vertical light reflective members.

7. The stereoscopic image forming device as defined in claim 6, wherein one side of the transparent flat plate material includes a plurality of trapezoidal cross-sectional first projections each having a vertical surface and an inclined surface and a plurality of triangular cross-sectional first grooves each formed in between the adjacent first projections, the plurality of first projections and the plurality of first grooves each formed along a radius of a circle centered on the reference point X; the other side of the transparent flat plate material includes a plurality of trapezoidal cross-sectional second projections each having a vertical surface and an inclined surface and a plurality of triangular cross-sectional second grooves each formed in between the adjacent second projections, the second projections and grooves each curved along each of a plurality of concentric circles centered on the reference point Y; and the vertical surfaces of the first and second projections are total reflection surfaces using the gas layer or the vacuum.

* * * * *